Sept. 1, 1959 J. F. DONAN ET AL 2,902,214

COMPUTER INPUT-OUTPUT SYSTEM

Filed Aug. 17, 1954 25 Sheets-Sheet 1

INVENTORS:
John F. Donan
Daniel J. Daugherty
Carl Beust
Louis A. Kline
By John J. Matlago, Agent
Their Attorneys INVENTORS:
John F. Donan
Daniel J. Daugherty
Carl Benst
Louis A Kline
By John J. Matlago, Agent
Their Attorneys Sept. 1, 1959 J. F. DONAN ET AL 2,902,214

COMPUTER INPUT-OUTPUT SYSTEM

Filed Aug. 17, 1954 25 Sheets-Sheet 3

INVENTORS:
John F. Donan
Daniel J. Daugherty

By Carl Beust
Louis A Kline
John T. Matlago, Agent
Their Attorneys.

INVENTORS:
John F. Donan
Daniel J. Daugherty
By Carl Berry
Louis A. Kline
John T. Matlago, Agent
Their Attorneys INVENTORS:
John F. Donan
Daniel J. Daugherty
By Carl Beust
Louis A. Kline
John J. Matlago, Agent
Their Attorneys INVENTORS:
John F. Donan
Daniel J. Dougherty
Carl Berst
Louis A. Kline
By John J. Matlago, Agent
Their Attorneys INVENTORS:
John F. Donan
Daniel J. Daugherty
By Carl Beust
Louis A. Kline
John T. Matlago, Agent
Their Attorneys.

INVENTORS:
John F. Donan
Daniel J. Daugherty
Carl Beust
Louis A. Kline
By John J. Matlago, Agent
Their Attorneys INVENTORS:
John F. Donan
Daniel J. Daugherty
Carl Benst
Louis A Kline
By John T. Matlago, Agent
Their Attorneys INVENTORS:
John F. Donan
Daniel J. Daugherty
By Carl Benst
Louis A Kline
John J. Matlago, Agent
Their Attorneys

COMPUTER INPUT-OUTPUT SYSTEM

Filed Aug. 17, 1954 25 Sheets-Sheet 11

INVENTORS:
John F. Donan
Daniel J. Daugherty
By Carl Burst
Louis A. Kline
John J. Matlago, Agent
Their Attorneys INVENTORS:
John F. Donan
Daniel J. Dougherty
Carl Benat
Louis A. Kline
By John T. Matlago, Agent
Their Attorneys INVENTORS:
John F. Donan
Daniel J. Daugherty
Carl Benst
Louis A Kline
By John T. Matlago Agent
Their Attorneys INVENTORS:
John F. Donan
Daniel J. Daugherty
Carl Beust
Louis A. Kline
By John J. Matlago, Agent
Their Attorneys Fig. 13
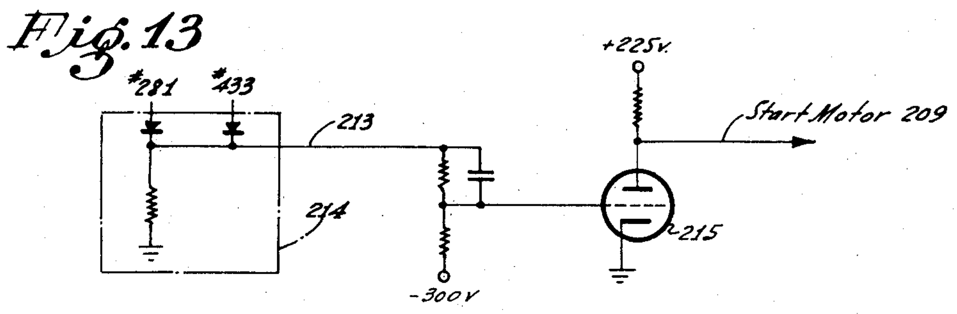
Fig. 14
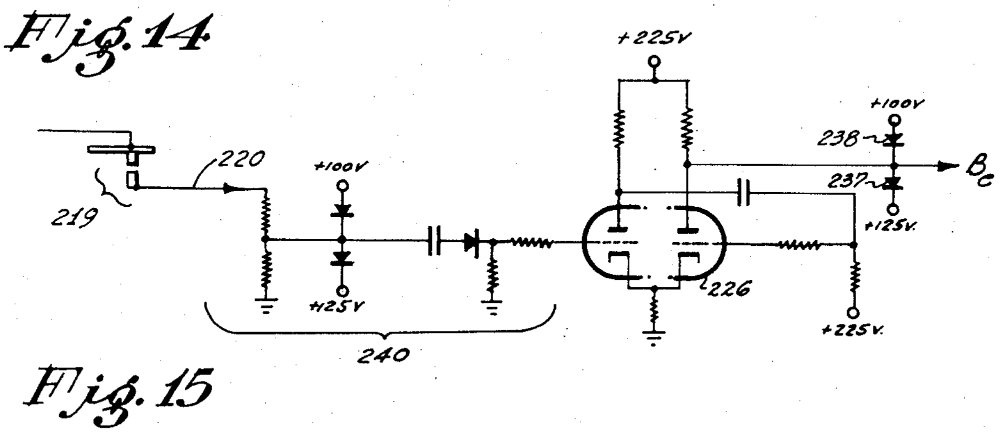
Fig. 15
| Row of Card being Read or Punched | Content of E Register (All D Periods) | | | | Decimal Equivalent |
|---|---|---|---|---|---|
| R | 0 | 1 | 0 | 0 | 1 |
| X | 0 | 1 | 1 | 0 | 3 |
| 0 | 0 | 0 | 1 | 1 | 0 |
| 1 | 0 | 1 | 0 | 0 | 1 |
| 2 | 0 | 1 | 0 | 1 | 2 |
| 3 | 0 | 1 | 1 | 0 | 3 |
| 4 | 0 | 1 | 1 | 1 | 4 |
| 5 | 1 | 0 | 0 | 0 | 5 |
| 6 | 1 | 0 | 0 | 1 | 6 |
| 7 | 1 | 0 | 1 | 0 | 7 |
| 8 | 1 | 0 | 1 | 1 | 8 |
| 9 | 1 | 1 | 0 | 0 | 9 |
INVENTORS:
John F. Donan
Daniel J. Daugherty
By Carl Berg & Louis A Kline
John T. Matlago, Agent
Their Attorneys INVENTORS:
John F. Donan
Daniel J. Daugherty
Carl Beust
Louis A. Kline
By John T. Matlago, Agent
their Attorneys INVENTORS:
John F. Donan
Daniel J. Daugherty
By Carl Beust
Louis A Kline
John J. Matlago, Agent
Their Attorneys.

INVENTORS:
John F. Donan
Daniel J. Daugherty
Carl Benst
Louis A. Kline
By John J. Matlago, Agent
Their Attorneys.

Sept. 1, 1959 J. F. DONAN ET AL 2,902,214
COMPUTER INPUT-OUTPUT SYSTEM
Filed Aug. 17, 1954 25 Sheets-Sheet 19

INVENTORS:
John F. Donan
Daniel J. Dougherty
Carl Beust
Louis A. Kline
By John J. Matlago, Agent
Their Attorneys.

INVENTORS:
John F. Donan
Daniel J. Daugherty
Carl Benst
By Louis A Kline
John T. Matlago, Agent
Their Attorneys INVENTORS:
John F. Donan
Daniel J. Daugherty
By Carl Beust
Louis A. Kline
John T. Matlago, Agent
Their Attorneys $$G_0 = G_5 (PCS1 + PCS2 + PCS6 + PCS7 + \#297 + \#445)$$

$$E_0 = E_5\, PCS11 + (P_1 + P_2)\#439 + [(E_5 K_3' + E_5' K_3) A_9 + E_5 A_9'](\#294 + \#433) + (P_0 + P_1)\#290$$

INVENTORS:
John F. Donan
Danial J. Daugherty
By Carl Beust
Louis A. Kline
John T. Matlago, Agent
Their Attorneys.

$$V_0 = \gamma\,{}^{\#}296 + P_{0-2}\,{}^{\#}281 + V_1(PCS4 + PCS6 + PCS7 + {}^{\#}282 + {}^{\#}285 + {}^{\#}286 + {}^{\#}289 + {}^{\#}290 + {}^{\#}293 + {}^{\#}294 + {}^{\#}297)$$
$$+ [D_{0-9}V_1 + D_{10}(\Delta_1 E_5 + \Delta_1' V_1)]({}^{\#}284 + {}^{\#}288 + {}^{\#}292)$$

INVENTORS:
John F. Donan
Daniel J. Daugherty
Carl Beust
Louis A. Kline
By John T. Matlago, Agent
Their Attorneys.

INVENTORS:
John F. Donan
Daniel J. Daugherty
Carl Bengt
Louis A. Kline
By John J. Matlago, Agent
Their Attorneys.

INVENTORS:
John F. Donan
Daniel J. Daugherty
By Carl Beust
Louis A Kline
John T. Matlago, Agent
Their Attorneys 2,902,214

COMPUTER INPUT-OUTPUT SYSTEM

John F. Donan, Reseda, and Daniel J. Daugherty, Torrance, Calif., assignors to The National Cash Register Company, Dayton, Ohio, a corporation of Maryland Application August 17, 1954, Serial No. 450,366
18 Claims. (Cl. 235—61.7)

This invention relates to means for conveying information between the cyclical memory of a digital computer and an external storage device such as the record card type.

It is highly desirable in the computer art, to provide fast acting means for transferring information between a computer memory or storage register and an external storage medium such as the well-known record card arranged with discontinuities to represent the information.

Heretofore, the means provided for effecting this communication were comprised of a plurality of mechanical relays or switches the contacts of which were sequentially arranged to operate as directed by energizing means continuously responsive to the information on the record cards. It is well known, however, that the relatively slow inherent operating characteristics of the mechanical relays or switches precludes their use at the high speeds at which electronic digital computers operate, thus requiring that relatively long delays be provided for in programming the computer to operate with such external storage mediums.

Accordingly the present invention provides for speeding up the communication of a digital computer with, for example, a card storage device, by use of a one-word recirculating register in the computer which is synchronized to cooperate with a buffer register (a multi-word recirculating register) in the computer and with the scanning of record card rows. Using such a system, as the record card is advanced row by row past the sensing device by its handling mechanism, this one-word recirculating register is timed to change the coded digits stored therein so as to equal the digit value assigned to the row of the card to be scanned. This change is made in advance of the positioning of the card to that row. Thus at the instant the digit is to be transferred, the electronic coded signal corresponding to this digit is available in the one-word register.

More particularly, the proper positioning of a row of the record card during either the read or punch process is sensed by means of an electrical switch operated by projections on a gear spaced to correspond with the row positions. For the card "read routine," in which it is desired to transfer coded digits from a record card to the computer buffer register and thence to the memory, as each hole in the row of the card is detected in turn, its corresponding brush picks up the bus bar voltage through the card, thereby energizing the computer diode network which effectively transfers coded digit signals in the one-word register into the buffer register. This process is repeated for succeeding card rows. For the card "punch routine," in which it is desired to transfer information from the buffer register to the record card, the information having previously been transferred to the buffer register from the memory, the present coded digit content of the one-word register is compared with that of the buffer register, and where corresponding digits are equal the diode network is arranged to sequentially pulse the grids of corresponding thyratrons, which energize relays to punch the card. The last card row to be read or punched is sensed by the diode network, which identifies the content of the one-word register as corresponding to the digit value of the last row. The routine is then automatically halted if only one card is involved, or repeated if many cards are involved.

It may be noted that these processes are fully commensurate with the computer operating speed and thus, having once positioned the card, no delay need be provided to effectively inhibit the computer arithmetic unit until spurious effects, such as switching transients, due to the operating characteristics of mechanical devices, have dissipated.

It is thus one of the objects of the present invention to provide a system of transferring information between record media of the card type particularly and the buffer register of a digital computer at speeds commensurate with the operating speed of the computer.

Another object of this invention resides in a novel means for making available coded signals corresponding to digits to be transferred, in advance of sensing, whether such a digit is to be transferred or not.

Another object of this invention is to provide a fast-acting, cyclical step process operating in accordance with the basic tenets of logical design, for the transfer of information between record cards and a digital computer.

Another object of this invention is to provide means of synchronizing the operation of a high speed computer and record card reading and punching equipment.

Other objects and many of the attendant advantages of this invention will be readily appreciated as the same becomes better understood by reference to the preferred embodiment detailed in the following description and the accompanying drawings wherein.

Figs. 10*a* to 10*d* show the portion of the functional flow diagram of the computer which accomplishes the card read routine.

Figs. 11*a* to 11*d* show the portion of the functional flow diagram of the computer which accomplishes the card punch routine.

Figure 12:
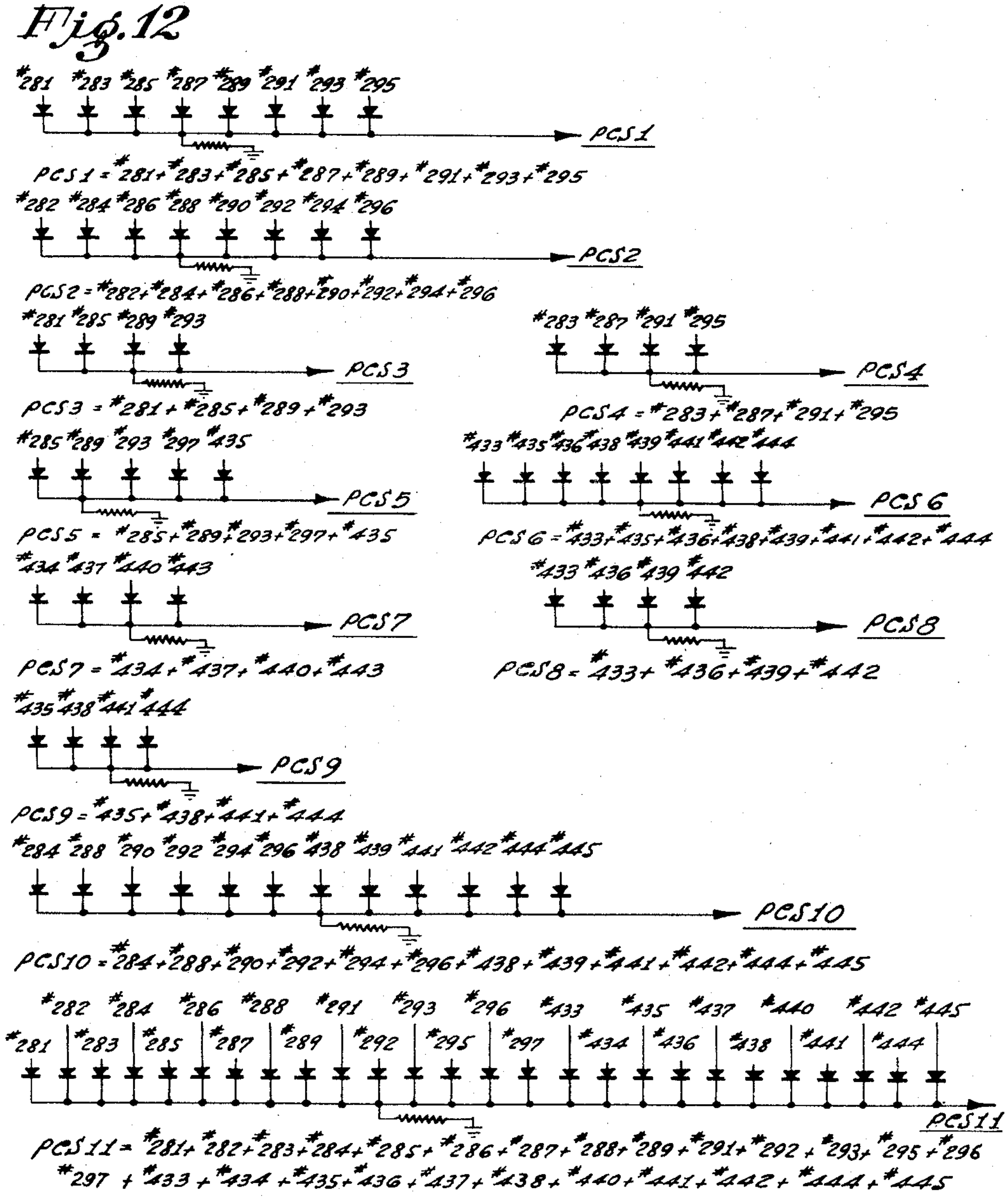

Fig. 12 shows the diode networks provided for generating the program counter sums needed in the networks for the logical propositions.

Fig. 13 shows the circuitry provided for starting the motor of the card handling unit.

Fig. 14 shows a schematic diagram of the circuitry for the card row sensing proposition $B_c$.

Fig. 15 is a table showing the content of the one-word recirculating E register during the card read or card punch routines.

Figures 16, 20:
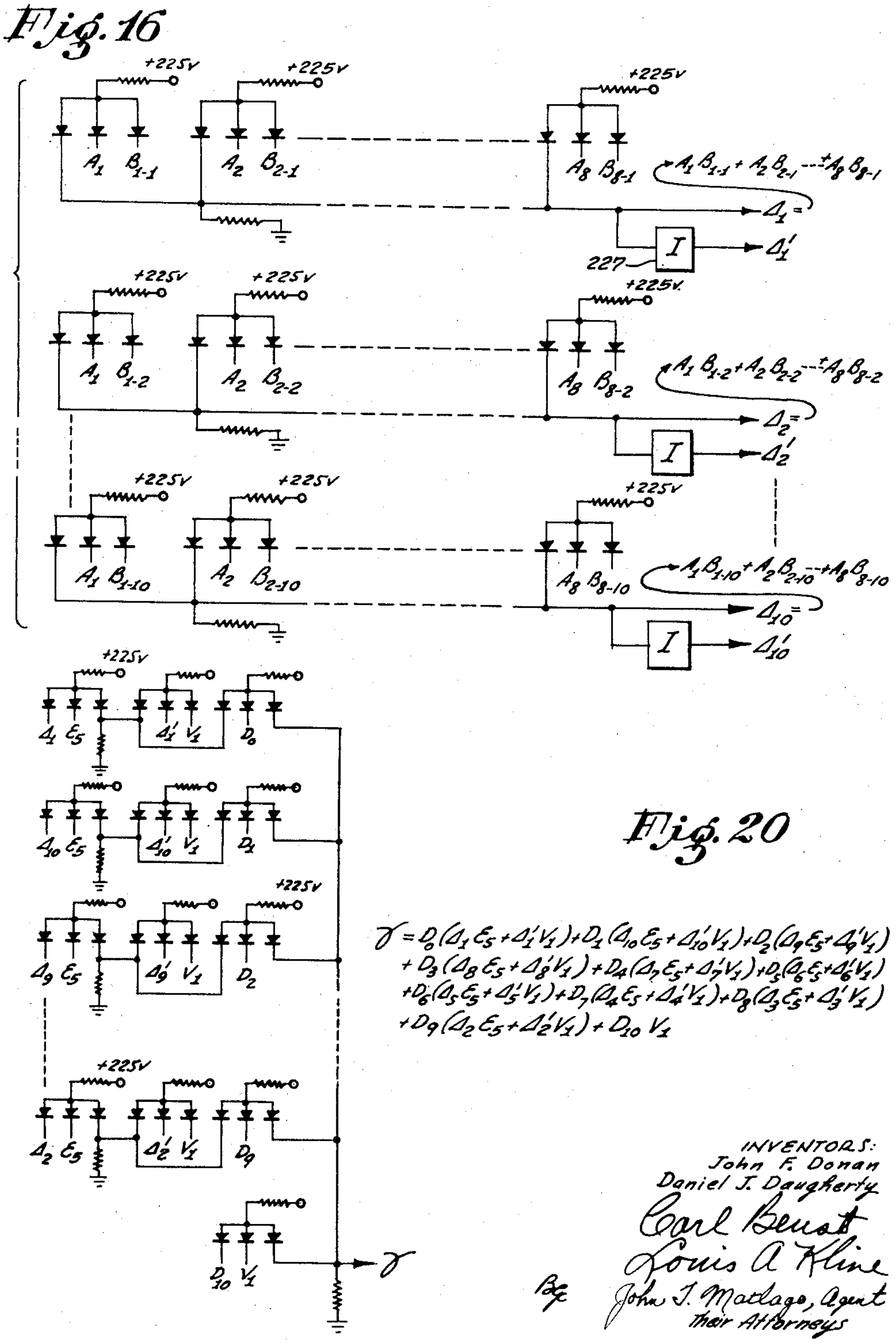

Fig. 16 is an electrical diagram of the diode networks for generating the Δ equations controlling the input to the buffer register during the card read routine.

Figure 17:
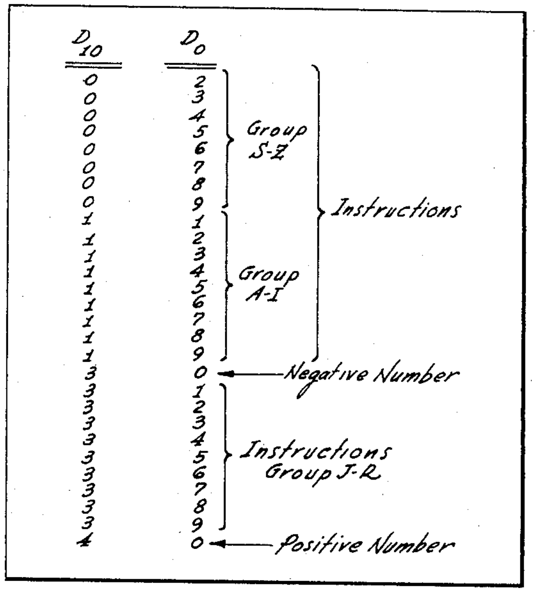

Fig. 17 is a table indicating the coded information used for representing the instructions and numbers provided for in the computer.

Figure 18:
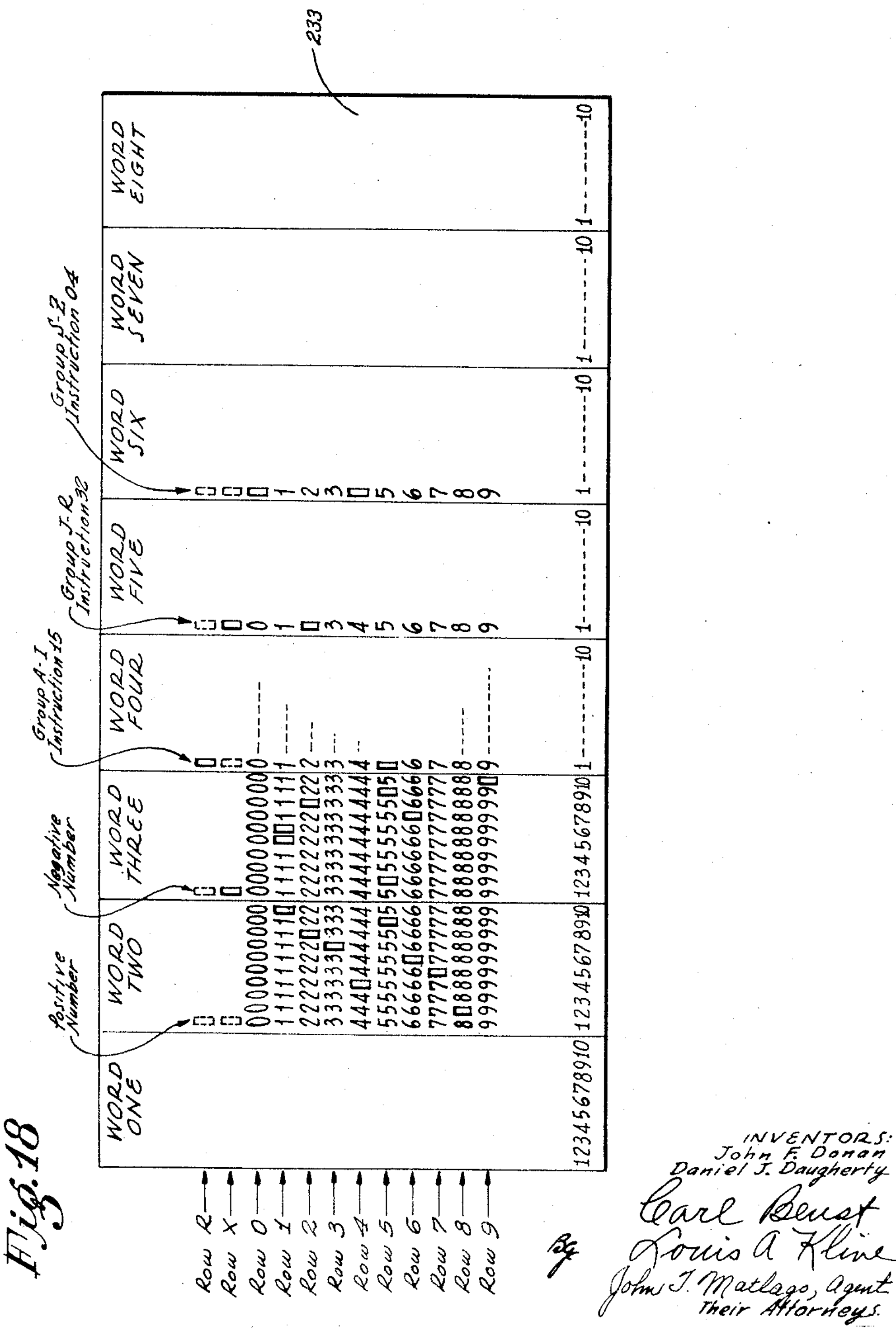

Fig. 18 illustrates the arrangement of words on one form of card employed with the present invention.

Figure 19:
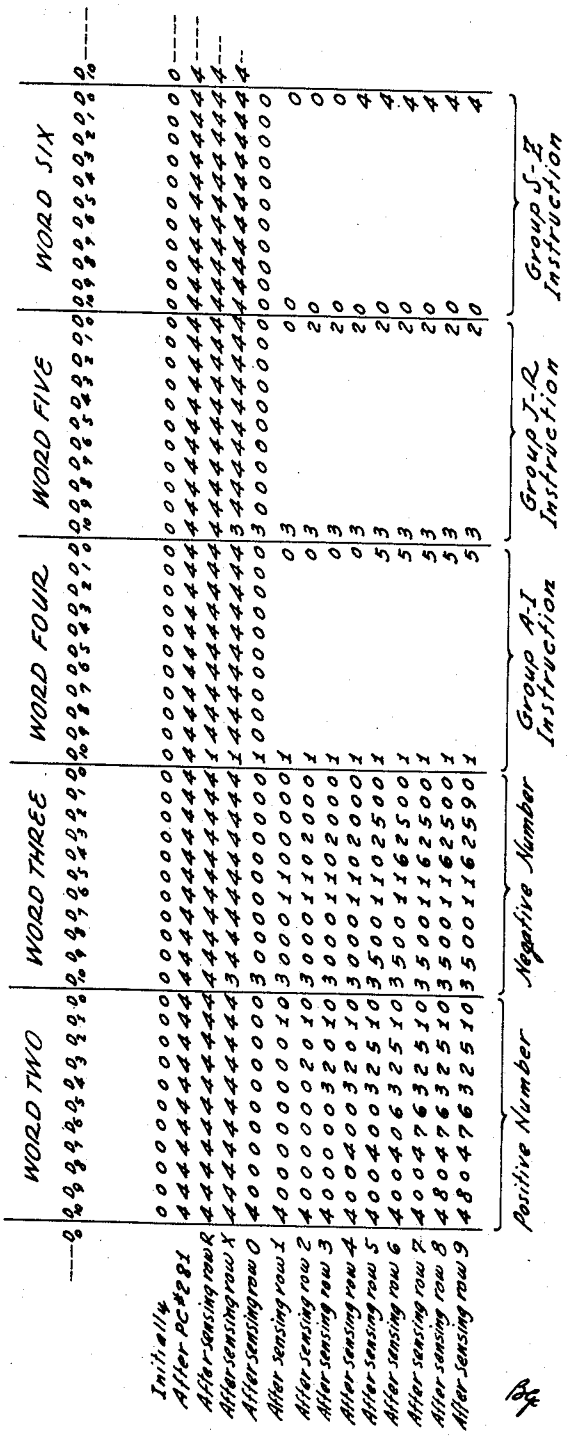

Fig. 19 is a table showing the successive content of the buffer register during the reading of the card shown in Fig. 18.

Fig. 20 is an electrical diagram of the diode networks for generating the $\gamma$ equation controlling the input to the buffer register during the card read routine.

Figs. 21, 22, 23, and 24 are block diagrams of flip-flops A9, K2, K3, and E2, respectively, together with their logical equations and triggering diode networks.

Figure 25:
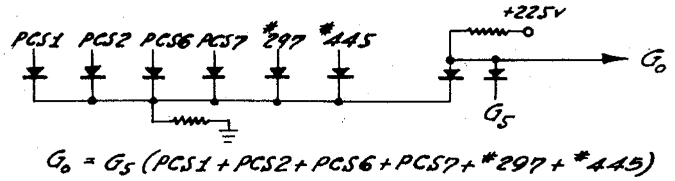
Figure 26:
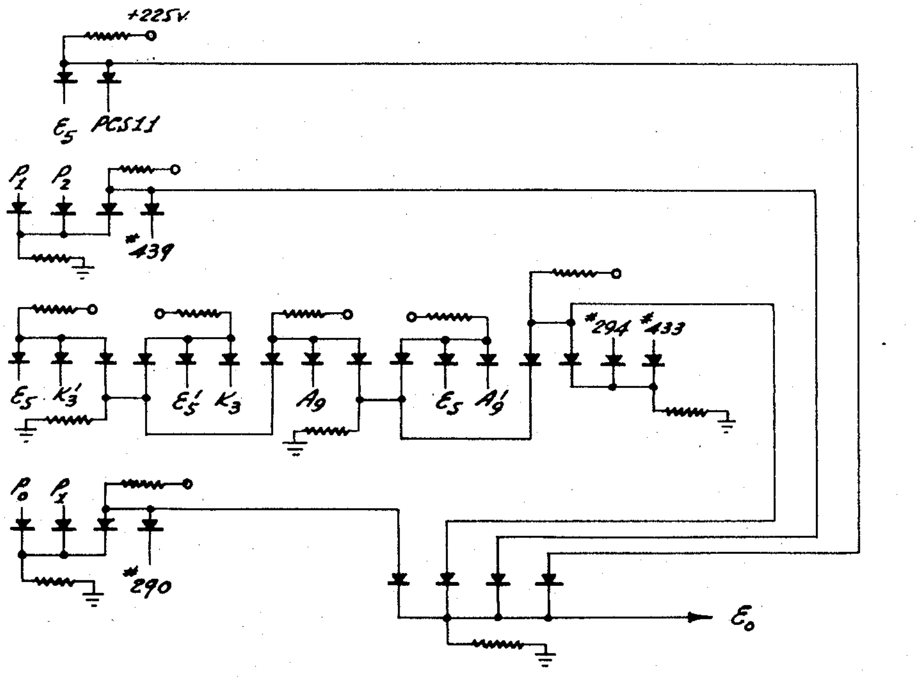
Figure 27:
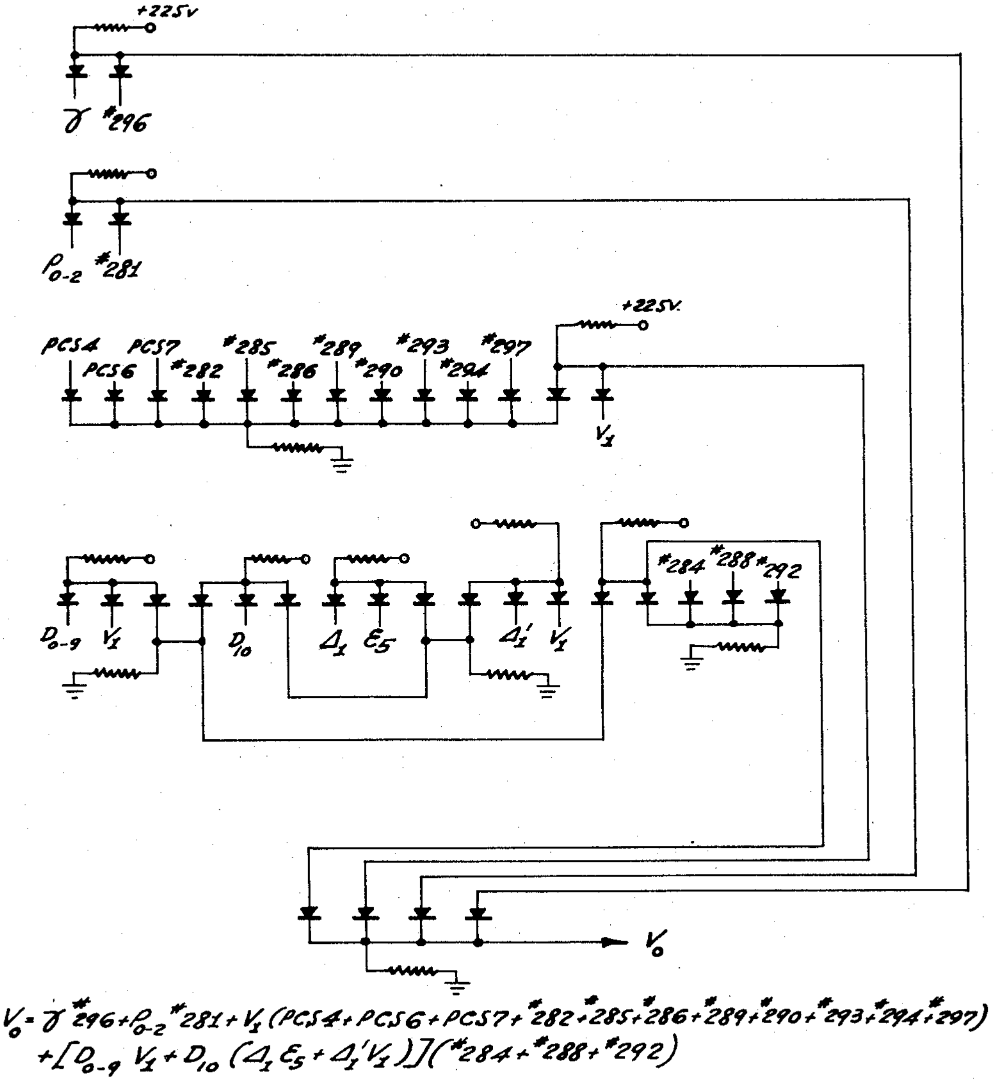

Figs. 25, 26, and 27 show the diode network for generating the equations for propositions $G_0$, $E_0$, and $V_0$, respectively.

Figure 28:
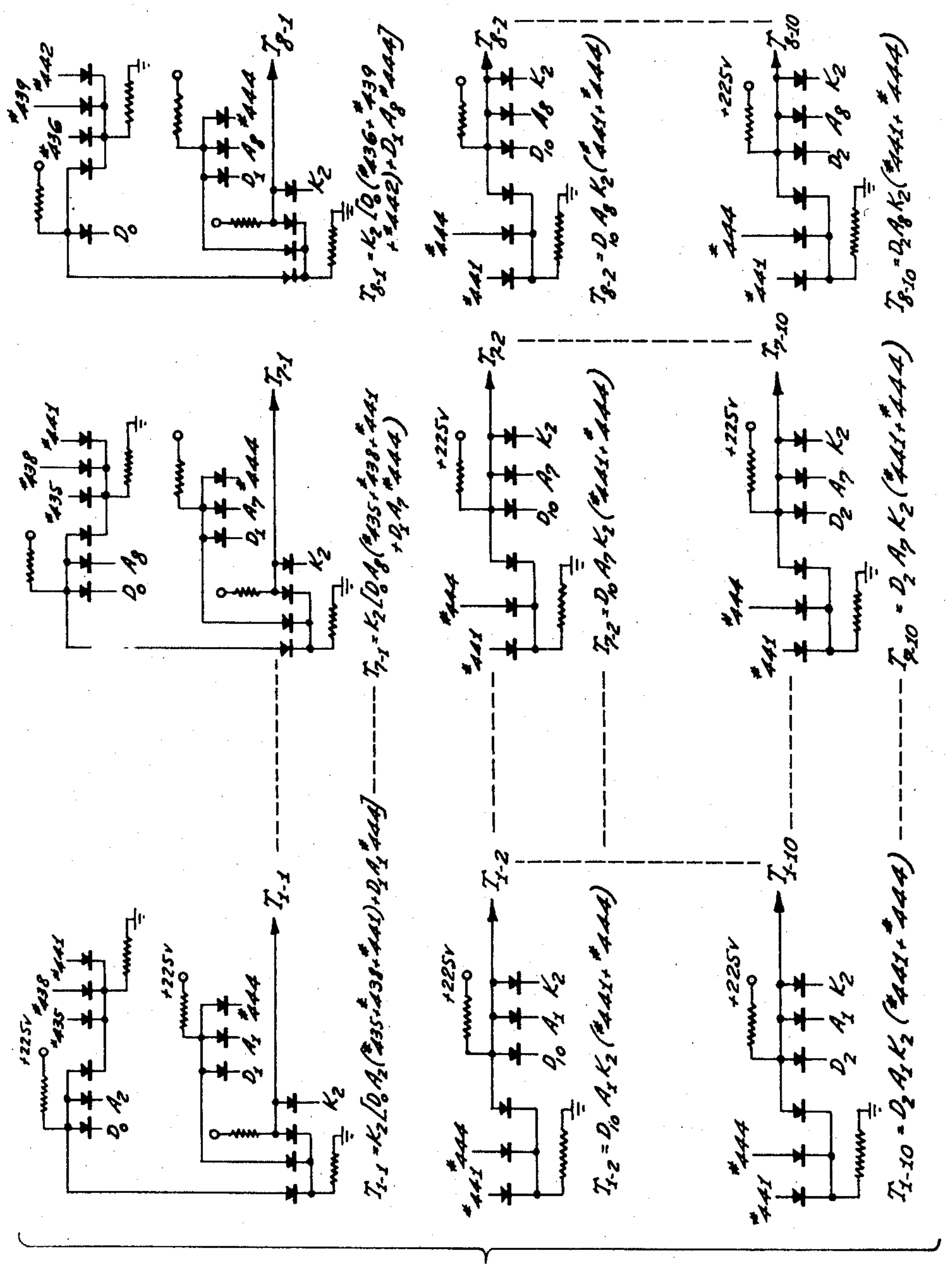

Fig. 28 shows the diode networks and equations for the thyratron firing propositions generated during the card punch routine.

Figure 29:
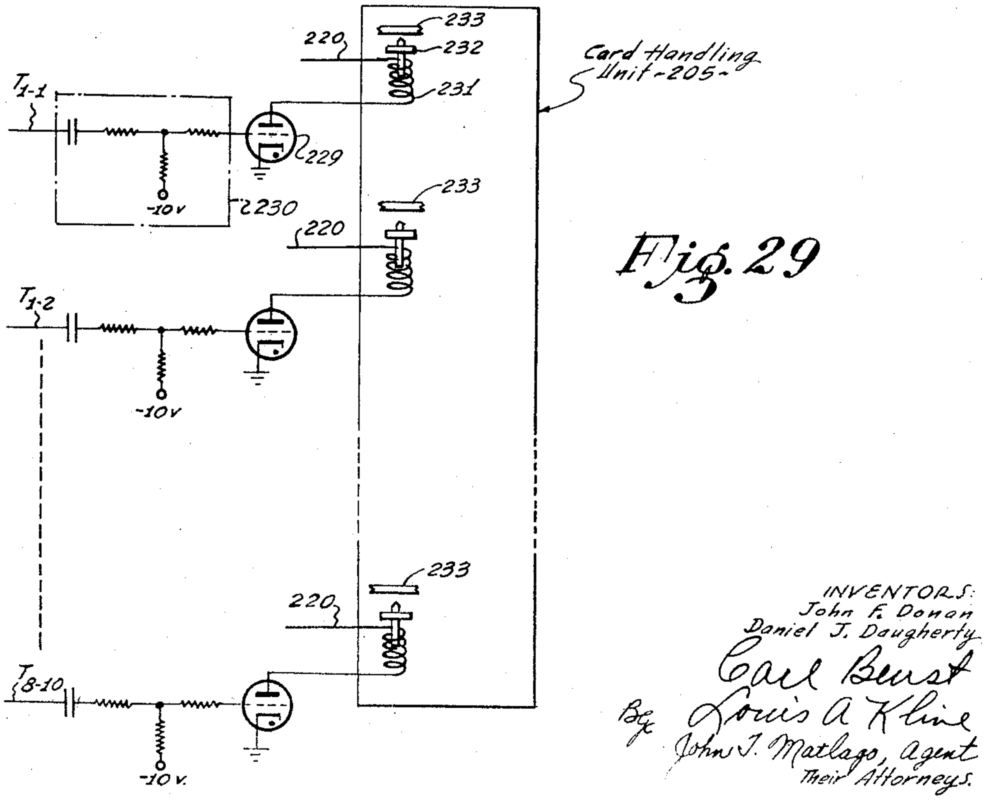

Fig. 29 shows the thyratron tubes and circuits employed to energize the punching relays of the card handling unit.

Figure 30:
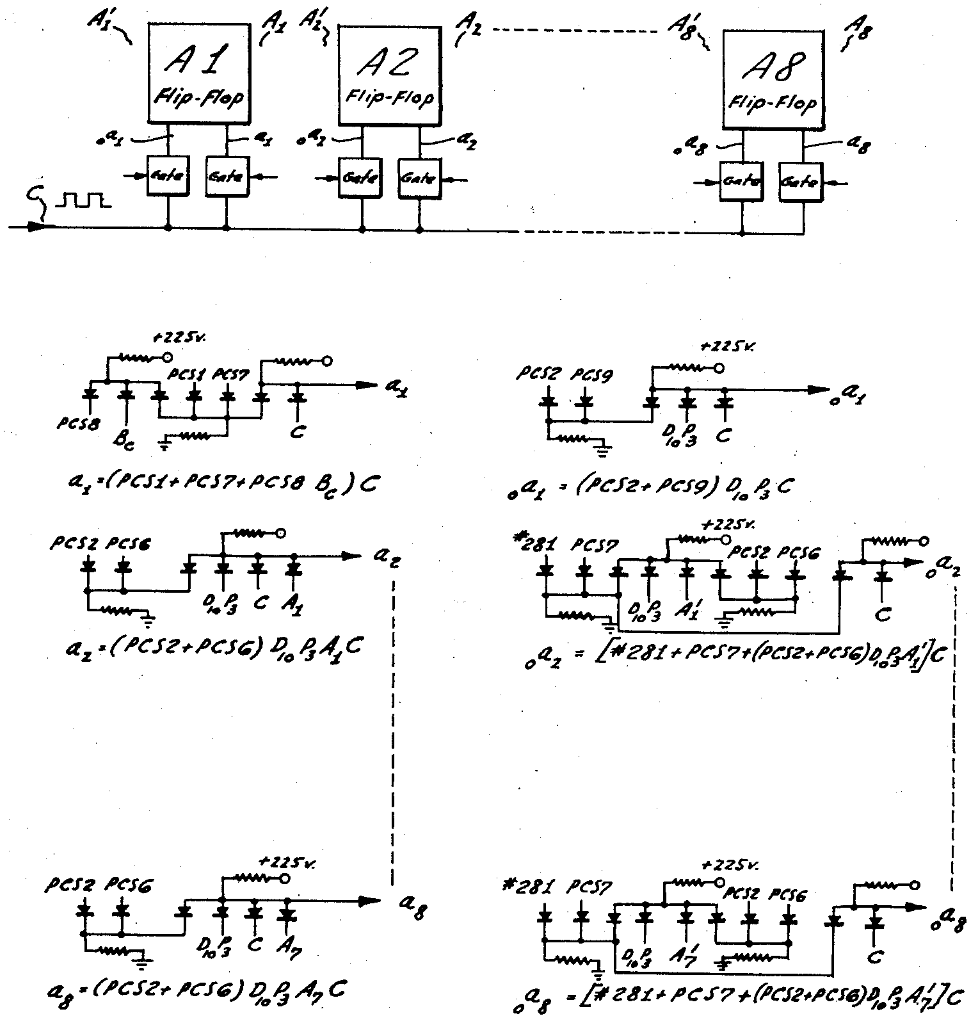

Fig. 30 shows block diagrams of counter flip-flops A1 to A8 together with their logical equations and triggering diode networks.

The invention herein disclosed is intended as part of a general purpose computer, such as that fully disclosed and claimed in a copending patent application of Eckdahl et. al., Serial No. 325,144, filed December 10, 1952, enabling the computer to operate with conventional card punch equipment. It is to be noted that this specification and the accompanying drawings will describe and illustrate in detail only such portions of the computer and card punch as are directly concerned with the present invention and are necessary to explain the principle thereof.

Figure 1:
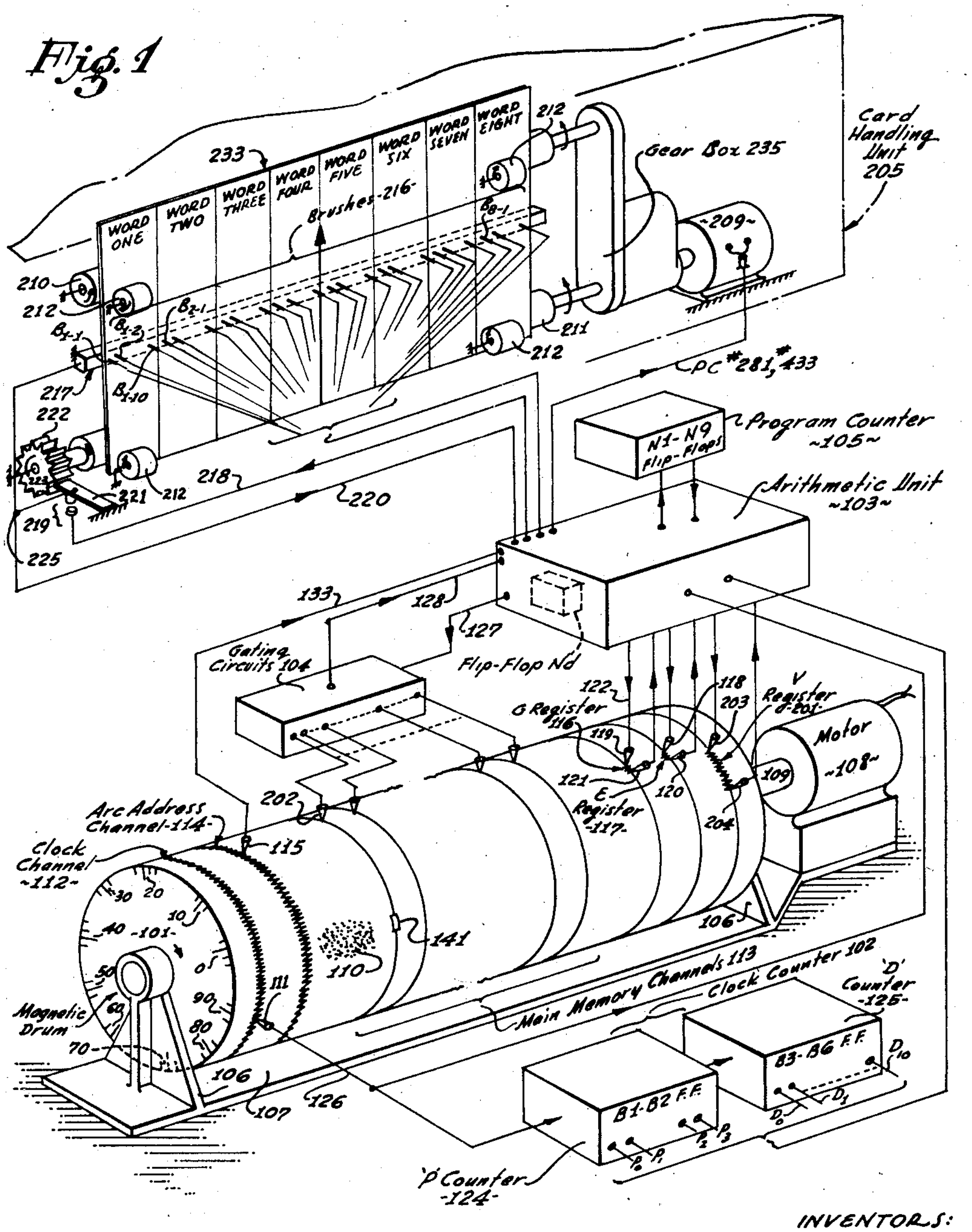
Fig. 1 is a perspective view illustrating the cooperative relationship of relevant portions of the computer system exemplifying the present invention.

Referring first to Fig. 1, a perspecive view is shown of a computer incorporating the preferred embodiment of the present invention, along with associated equipment as required for a computer system.

Here is shown memory drum 101, supported on suitable arbor mounts 106 and a base plate 107. Drum 101 is rotated in a clockwise direction, as indicated by the arrow on its left end, by motor 108 through drive shaft 109. Deposited on the surface of drum 101 is a coating 110 of magnetic material, such as ferric oxide, which enables information to be stored as magnetic patterns thereon. Shown stationarily positioned to have a working relation with coating 110 are a plurality of sensing elements, such as head 111, which, as drum 101 revolves, define circumferential channels, such as clock channel 112.

Commencing from the left end of drum 101, the first channel thus defined is designated clock channel 112 and the second is arc address channel 114. These two channels contain permanently recorded information. Next is shown a group of channels cumulatively designated main memory channels 113. The information in these is comprised of computer "words" as hereinafter described. Toward the right end of drum 101 three more channels are provided. These channels are different from the others in that only a small arc on each is storing useful information at any given time. Also, this information is stored dynamically in that the moving arc serves as a medium for temporarily delaying information recorded thereon so that it can be picked up a fixed period later. As will be subsequently described, the combination of the the delay obtained by this means, together with a delay obtained by a series of flip-flop circuits in arithmetic unit 103 constitute each of the loops referred to as the G and E recirculating registers 116 and 117 respectively, and the V recirculating (buffer) register, 201. Each of these recirculating registers provides means for serially recirculating information through arithmetic unit 103 so that it can be operated upon.

Clock channel 112 completely circumscribes drum 101 and contains a permanently recorded magnetic flux pattern representing an electrical sine wave so as to form a closed loop. Each cycle of this sine wave defines an elemental memory area on the drum periphery on which a binary bit of information may be recorded. Thus the signals on clock channel 112 divide the drum circumference into a fixed number of such elemental areas; namely, 4400 in the present computer. Clock head 111 is stationarily positioned close to the drum periphery and senses the changes in magnetic flux pattern, thereby generating an electrical signal indicative of each sine wave cycle. In construction, clock head 111 is comprised of a split core of soft iron or a like conductor of magnetic lines of force, and a coil wound thereon, in which the electrical sine waveform is induced as the magnetic flux on drum 101 moves past the core gap. One terminal of the coil is grounded and the other terminal is connected to circuitry designed to shape the induced voltage preliminary to causing it to serve as a driving voltage for other components. A consideration of clock line 126 will exemplify such circuitry. Although clock channel 112 is impressed with a pattern resembling a sine wave, the clock input to clock counter 102 and arithmetic unit 103 is a symmetrical square wave, the period of which is equal to that of the original sine wave and the amplitude of which is clamped between +100 v. D.C. and +125 v. D.C. This square wave will be referred to hereinafter as the clock signal C (see Fig. 8, line I) and the time period between trailing edges of the clock signal will be designated one clock period. Additionally, the half of the clock signal which is at the potential of +125 v. D.C. will be referred to as the clock pulse, since it is the trailing edge of this half only which triggers logical circuitry in the computer.

Circuitry which effectuates the change from sine wave to the clock signal is driven by the output of clock head 111. As previously stated, this circuitry is schematically represented in Fig. 1 by clock line 126 and may comprise several stages of amplification, a pulse shaping circuit, a triggering circuit of the Schmitt type, and a diode clamping arrangement, as already disclosed in the prior art. The clock signal thus provided is used for synchronizing logical networks of arithmetic unit 103 and to drive clock counter 102. It should be understood that all logical propositions in the computer operate at the same two voltage levels as the pulses of the clock signal, i.e., +100 v. D.C. and +125 v. D.C. With regard to the activation of circuitry the former voltage level is ineffective while the latter is effective.

It is by utilizing the signals induced by clock channel 112 as a reference during reading and recording that the computer effectively divides the other circumferential channels of drum 101 into a similar number of elemental memory areas and also synchronizes the operation of all circuits so that they operate in accordance with a basic timing logic. Each of these elemental memory areas on the periphery of drum 101 in the other channels shown in Fig. 1 is capable of containing a digit of binary information, i.e., a saturated flux pattern either in one direction or the other. When the flux is in one direction in a given elemental memory area, a binary digit "one" is represented; when it is in the other direction, a binary digit "zero" is represented. Since the non-return-to-zero method of storing information on the drum is employed, the recorded flux pattern changes for successive memory areas only when the binary digits of a sequence change from 0 to 1, or vice versa.

Computer components are designed to serially handle information in blocks consisting of a fixed number of binary digits. These blocks may represent either commands or numbers and are commonly referred to as "words." A word is comprised of a sequence of 44 consecutive binary digits and thus requires 44 consecutive memory areas for storage. The portion or arc of a circumferential channel in which a word may be recorded, such as arc 141 of Fig. 1, is designated a storage register. Since clock channel 112 contains 4400 clock signals, 100 such storage registers are provided along the circumference, that is, on each channel, of drum 101. As shown on the left end of drum 101 in Fig. 1, each of the arcs occupied by a storage register, such as arc 141, is assigned an arcuate address, 0 through 99, running consecutively in a counterclockwise direction such that the heads sense information in successive arcs of higher number except for the discontinuity when arc 99 is succeeded by arc 0. The time required for one arc to pass ahead is designated as one word period which is defined by 44 cycles of the sine wave passing clock channel head 111.

In order to enable arithmetic unit 103 to properly respond to and identify each of the digits in a storage register being sensed at any given time, clock counter 102, comprised of P counter 124 and D counter 125, is provided for counting successive clock pulses. Clock counter 102 responds to 44 clock pulses to define each word period. P counter 124 responds directly to the output of clock line 126 (i.e., to clock pulses) and has a capacity of four counts, namely, $P_0$, $P_1$, $P_2$, and $P_3$, before it resets. A carry pulse generated once each cycle of P counter 124 (i.e., at the end of the $P_3$ pulse) causes D counter 125 to manifest a new count throughout the next cycle of P counter 124. The capacity of D counter 125 is 16 counts of which the computer employs 11, i.e., although D counter 125 can count to 16, it is forced to reset to zero after the eleventh count. The counts of D counter 125 are designated $D_0$, $D_1$, . . . $D_{10}$ and with counts of P counter 124 are manifested by signal outputs feeding into arithmetic unit 103 such that, as drum 101 rotates and an arc or storage register is being sensed by the heads, succeeding elemental memory areas of the arc, hereinafter to be designated "pulse positions," are identified by clock counter 102 as $D_0P_0$, $D_0P_1$, $D_0P_2$, $D_0P_3$, $D_1P_0$, . . . $D_{10}P_3$. In summary, each word period is divided by this arrangement into eleven D (digit) periods each of which is subdivided into four P (pulse) positions and in each of the latter may be stored one binary digit of a binary-coded decimal digit. Accordingly, by noting the counts in clock counter 102, the pulse position in an arc, or storage register, presently being scanned by the heads on drum 101 can be observed.

The means employed in clock counter 102 to define any pulse position or combination of pulse positions of a word, so that circuitry in arithmetic unit 103 may be arranged to provide proper triggering for flip-flops as required by their respective equations, is well understood in the prior art. Thus, considering P counter 124, Fig. 1 indicates that two flip-flops, B1 and B2, are employed. The arrangement is a parallel on in that the clock signal C is simultaneously applied to all gates associated with the inputs to these flip-flops. The interconnection of the outputs, however, allow the flip-flops to be triggered by successive clock pulses only to change their states to indicate the P cyclical counts. It is well known that there are four possible different arrangements of two flip-flops and here each of the counts $P_0$, $P_1$, $P_2$ and $P_3$ represents a different configuration of flip-flops B1 and B2. The arrangement for D counter 125 is similar, and each of the counts $D_0$, $D_1$, . . . $D_{10}$ represents a different configuration of flip-flops B3 through B6. Depending upon the pulse position of an arc to be represented, a particular configuration of each of the two groups B1–B2 and B3–B6 is routed to arithmetic unit 103 during each clock period generated by clock line 126, effectuating a different arrangement in a matrix type of diode network, the effective output of which is used as an input to logical gates or mixers.

The configuration of computer words and the representation of decimal numerals employed by the computer will next be discussed as preliminary to a description of the other channels of drum 101.

The computer employs the "excess 3" binary number system. It is well understood that the excess 3 binary number system requires the use of four binary digits to represent a decimal digit. Thus, by referring, for instance, to Figs. 2 and 3, which show the computer word representations of a command and a number, respectively, it can be seen that an entire D period is required to store a decimal digit.

Figure 2:
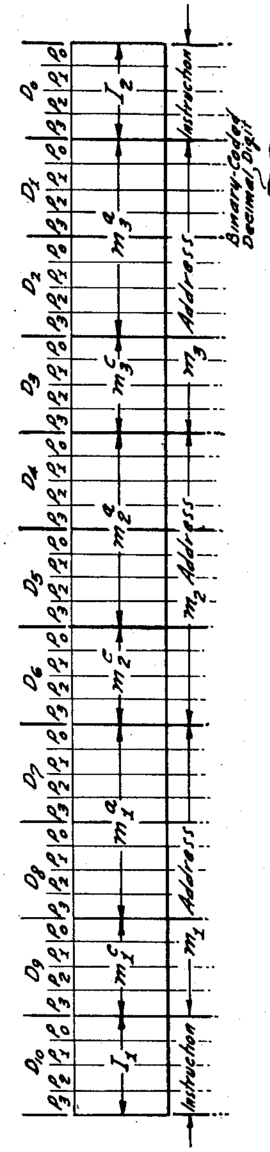
Fig. 2 shows the code pattern employed during a word period to represent a command.

Considering Fig. 2 first, it is seen that the command represented in general notation therein is divided into eleven D periods, marked $D_0$ through $D_{10}$ from right to left, while each D period is further divided into four P positions. The information in a command is defined by the general notation "$I_1$, $m_1$, $m_2$, $m_3$, $I_2$," where $m_1$, $m_2$, and $m_3$ represent addresses (arc and channel) of arcs or storage registers in the memory channels 113 (Fig. 1), and $I_1$ and $I_2$ correspond to an instruction to be carried out by arithmetic unit 103. Each of the sections $m_1$, $m_2$, and $m_3$ of the command is in turn divided into two portions, such as $m_1^a$ and $m_1^c$ for the $m_1$ address. The superscripts "*a*" and "*c*" characterize that information in these portions is descriptive of the arc address and channel address, respectively, of an arc on drum 101. Hence $m_1^a$, located in periods $D_7$ and $D_8$, comprises binary-coded excess 3 numerals representative of any of the arc 0 through 99; and $m_1^c$, located in period $D_9$, comprises a binary-coded excess 3 numeral representative of any of the main memory channels 113. The instructions which the computer is capable of carrying out are divided into three groups for purposes of convenient identification and a code is assigned to each group, as shown in Fig. 17. It is seen that the two decimal periods $D_0$ and $D_{10}$ ar reserved for the instruction codes.

Figure 3:
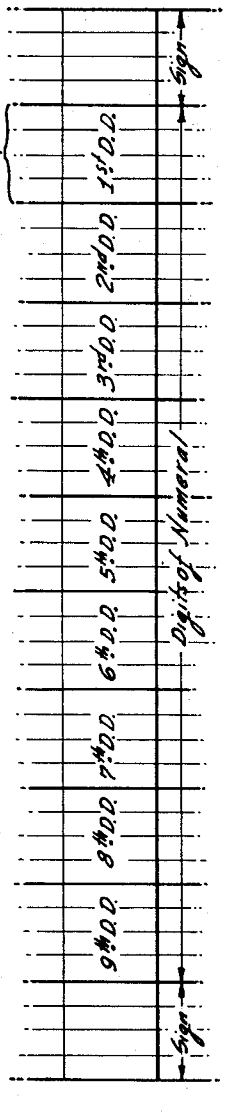
Fig. 3 shows the code pattern employed during a word period to represent a number.

With regard to Fig. 3, here it is shown that the arrangement for a number is divided into D periods and P positions similar to the arrangement of Fig. 2. The computer provides for operating on decimal numerals 9 digits in length, to which binary numerals 36 digits in length contained in periods $D_1$ through $D_9$ are equivalent. The $D_0$ and $D_{10}$ periods of the number contain coded information indicating whether the sign of the numeral is positive or negative. The table of Fig. 17 shows the content of the $D_0$ and $D_{10}$ periods for the two conditions of a number.

It will be noted that when the computer places a binary-coded excess 3 numeral in a D period, the least significant binary digit of the numeral occupies the $P_0$ position and binary digits of the successively greater significance occupy the positions $P_1$, $P_2$ and $P_3$ respectively. Also, the least significant decimal digit of a decimal numeral is placed in the lowest order D period of those assigned to the decimal numeral. Additionally, it should be noted that, in accordance with the rotation of drum 101, the first position of a word to pass a particular head is the $D_0P_0$ position.

Figure 4:
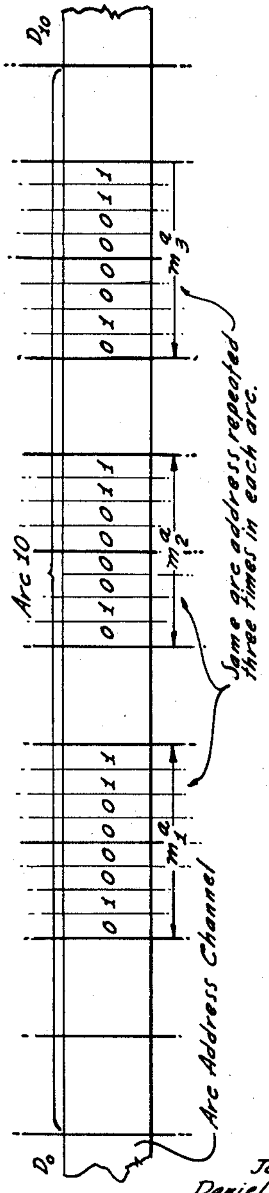
Fig. 4 illustrates one word period of the arc address channel and how the code pattern of a particular arc address is recorded thereon.
Figure 5:
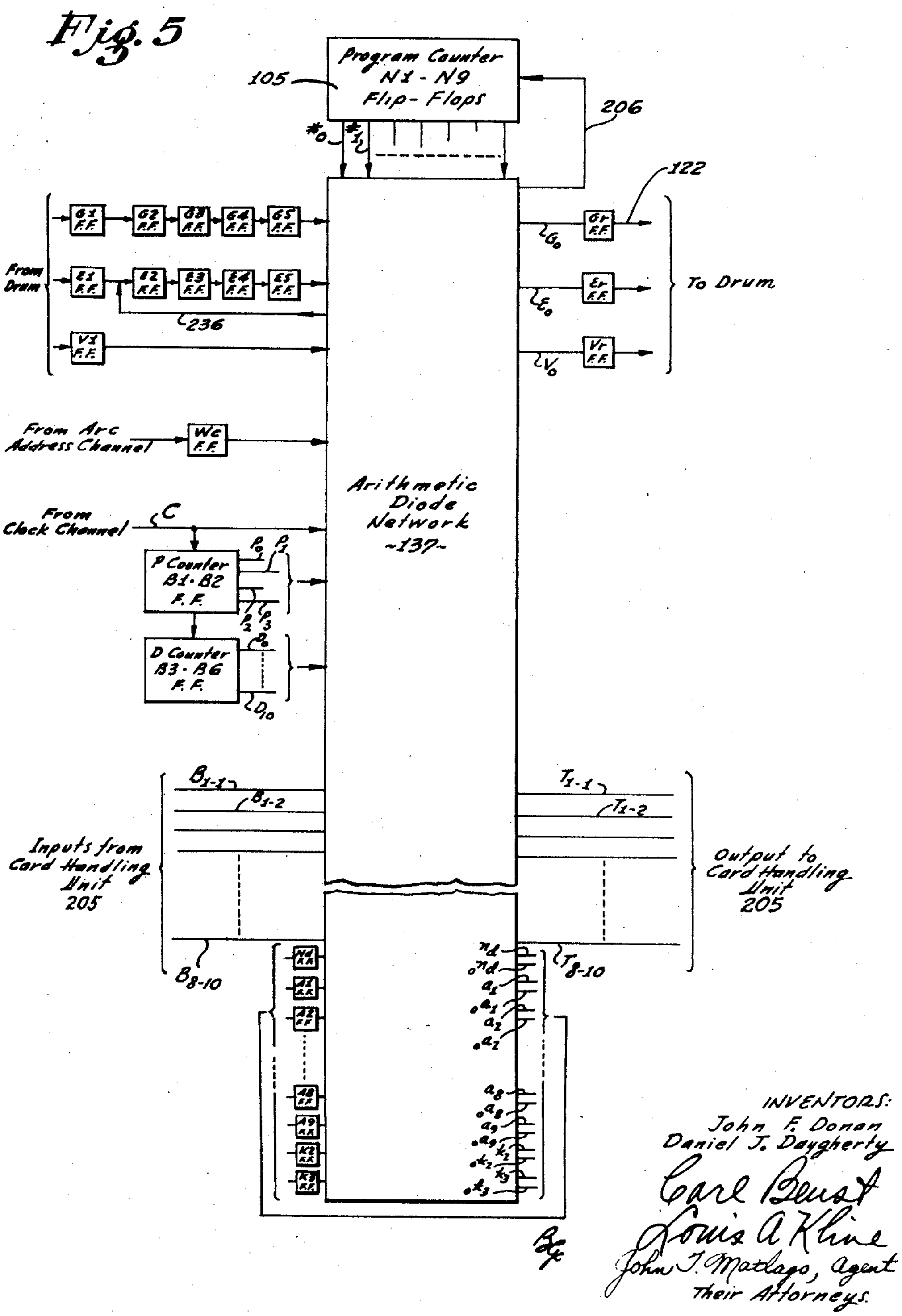
Fig. 5 is an overall diagram of the computer arithmetic unit showing relevant inputs, outputs and storage flip-flops.

Returning again to Fig. 1 and continuing with a description of the other channels on drum 101, the next channel is arc address channel 114. Each of the arcs of this channel contains a permanently recorded magnetic pattern representing the binary-coded excess 3 numeral equivalent of a decimal unit more than the decimal numeral which has been assigned to the arc, as indicated at the left end of drum 101 in Fig. 1. Associated with arc address channel 114 is head 115, which senses the code of each arc address as drum 101 revolves. Referring to the Fig. 4, a diagram of a portion of the arc address channel 114, defining in particular arc 10, is shown. In each of the arcs of arc address channel 114 corresponding to the $m^a$ portion of a word (i.e., in periods $D_{1-2}$, $D_{4-5}$, and $D_{7-8}$), signals representing the binary-coded excess 3 numeral indicaton of the decimal numeral assigned to this arc plus one are permanently recorded. As will be detailed later, the binary digits read from arc address channel 114 are serially set up in flip-flop W*c* (Fig. 5). It should be noted that the details of the circuitry for serially triggering flip-flop W*c*, in accordance with the magnetic pattern on arc address channel 114, has already been disclosed to the art. Briefly, the binary square wave pattern impressed in arc address channel 114 (Fig. 1) is sensed by arc address head 115 and, due to differentiation thereby, presents pulses representing the leading and trailing edges of the square wave. These pulses are amplified, clipped, clamped between the limits +100 v. D.C. and +125 v. D.C., and applied to the grid input circuits of flip-flop W*c*, through a diode gate such that the leading-edge pulse triggers the flip-flop into one state and the trailing-edge pulse triggers the flip-flop into the opposite state. The grid input circuit diode gates of flip-flop W*c* are synchronized with the clock pulses by application of the clock signal C from clock line 126. These concepts will be further clarified later in connection with the convention adopted to present the computer logic. The output of flip-flop W*c* provides one of the inputs to diode network 137 of arithmetic unit 103, as will also be shown hereinafter.

Next in order from the left end of drum 101 are the main memory channels 113. The information in main memory channels 113 is comprised of "words" constructed as aforementioned, on which and by which the computer operates. Main memory channels 113 are equipped with stationary memory heads, such as head 202, used for both reading and recording. Since information is always recorded into an arc of the main memory by reference to the D and P count signals of clock counter 102, the information recorded in a main memory channel register is always temporally aligned with the periods of the arcs already shown to be defined on drum 101 by arc address channel 114. As shown, information sensed by all memory heads is supplied to gating circuits 104 which control the connections thereof, permitting only one main memory channel to communicate with arithmetic unit 103 at a time.

Still referring to Fig. 1, at the right end of drum 101 are shown the G and E recirculating registers 116 and 117, and the V recirculating (buffer) register 201. Each of these recirculating registers has two heads associated with the drum memory, one for reading and the other for recording, arranged such that as drum 101 rotates, a portion of the drum surface will pass the record head first and the read head later. Thus G register 116 includes a read head 121 spaced along the drum surface ahead of a record head 119, and the E register 117 includes a read head 120 spaced along the drum surface ahead of the record head 118. Heads 203 and 204 are similar for V register 201. Thus, as far as the recirculating registers are concerned, only a small arcuate portion of the drum surface is used for storing information at a given time. For the G and E registers, the portion used occupies an area equivalent to less than 44 elemental memory areas, and the information is delayed in arithmetic unit 103 a given number of pulse periods so that the normal recirculating time for each of these registers is 44 clock periods, i.e., one word period. Both the G and E registers have their heads interconnected by way of the arithmetic unit 103 so that, for example, when the computer circuitry is set for recirculation in the E regiser, a particular unit signal on being recorded on the drum surface by record head 118, will be carried by the revolving drum 101 to read head 120, sensed thereby, transmitted to arithmetic unit 103 wherein the signal steps through flip-flop circuits, and is then retransmitted to record head 118 by which it is again recorded. As previously stated, the design of the computer is such that the normal total time required for a particular digit to make one such cycle in the G or E registers during normal recirculation is equal to one word period. This is true even if it is desired that this digit undergo a modification. In a similar fashion, for the V buffer register, the portion of drum 101 used occupies an area equivalent to several elemental memory areas less than 10 word periods, and the information is delayed in arithmetic unit 103 a given number of clock periods so that the normal recirculating time for this register is 10 word periods or 440 clock periods.

It should be understood that the read and record circuitry for the G and E registers and the V buffer register is well understood in the prior art. Briefly, as shown in Fig. 5, for the G register, the output of diode network 137 of arithmetic unit 103 designated as proposition $G_0$ ($E_0$ in the case of the E register and $V_0$ in the case of the V buffer register), is a square wave clamped between +100 v. D.C. and +125 v. D.C., and is fed to the gating circuit of one grid of flip-flop G*r* and, after inversion, is fed as proposition $G_0'$ to the gating circuit of the other grid of flip-flop G*r*. Both grid gates are synchronized with clock pulses by the clock signal C as heretofore mentioned. The outputs of flip-flop G*r*, namely, $G_r$ and $G_r'$, are represented by line 122 and are employed to energize record head 119. Nomenclature employed will be explained later.

Referring now to Fig. 5, more particularly, a schematic diagram is shown of the relation of arithmetic unit 103 to other components of the computer relevant to the invention. Arithmetic unit 103 is comprised in the main of a diode network 137 which operates to interconnect the flip-flop circuits of the computer to route information and to perform digital processes on the information in accordance with the commands provided. As noted, the flip-flop circuits are the source of the binary terms which make up the logical equations by which computer operations are represented.

Flip-flops G1, E1 and V1 are integrally parts of the G and E registers and the V buffer register, respectively, and operate such that their outputs directly follow the information read from their respective channels of drum 101.

Flip-flops G2 to G5 and E2 to E5 are also parts of the respective recirculating registers and serve to step information along to diode network 137. These flip-flops serve to give the recirculating registers a degree of flexibility in that information can be inserted into them from the diode network 137 by way of the inputs to the flip-flops, as, for instance, grid propositions $e_2$ and ${}_0e_2$ for flip-flop E2 (terminology to be explained later), as illustrated by line 236.

Flip-flops G*r*, E*r* and V*r* are similarly parts of the respective recirculating registers and respond to propositions $G_0$, $E_0$ and $V_0$ from diode network 137. These flip-flops serve to reconstruct and synchronize the signals derived from diode network 137 before recording them back onto drum 101.

As will be subsequently described, the function of flip-flop N*d* is to signal program counter 105 at the end of each word period to "count" to its next higher number, "skip" to a new number or "stick" in the same number.

Flip-flops A1 to A8 inclusive function as binary stages of a ring counter, described in connection with Fig. 10*a*.

Figure 10A:
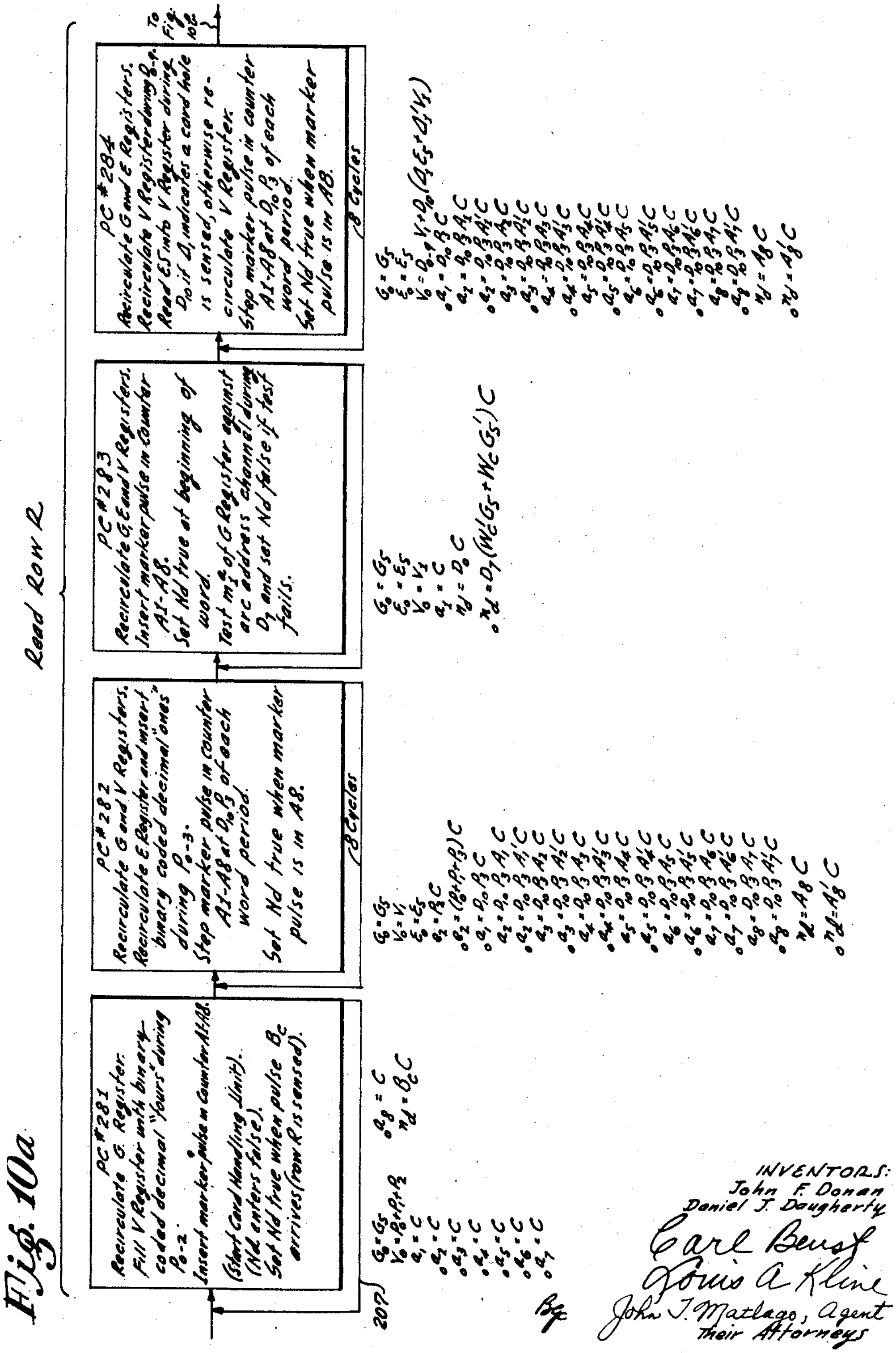
Figure 10F:
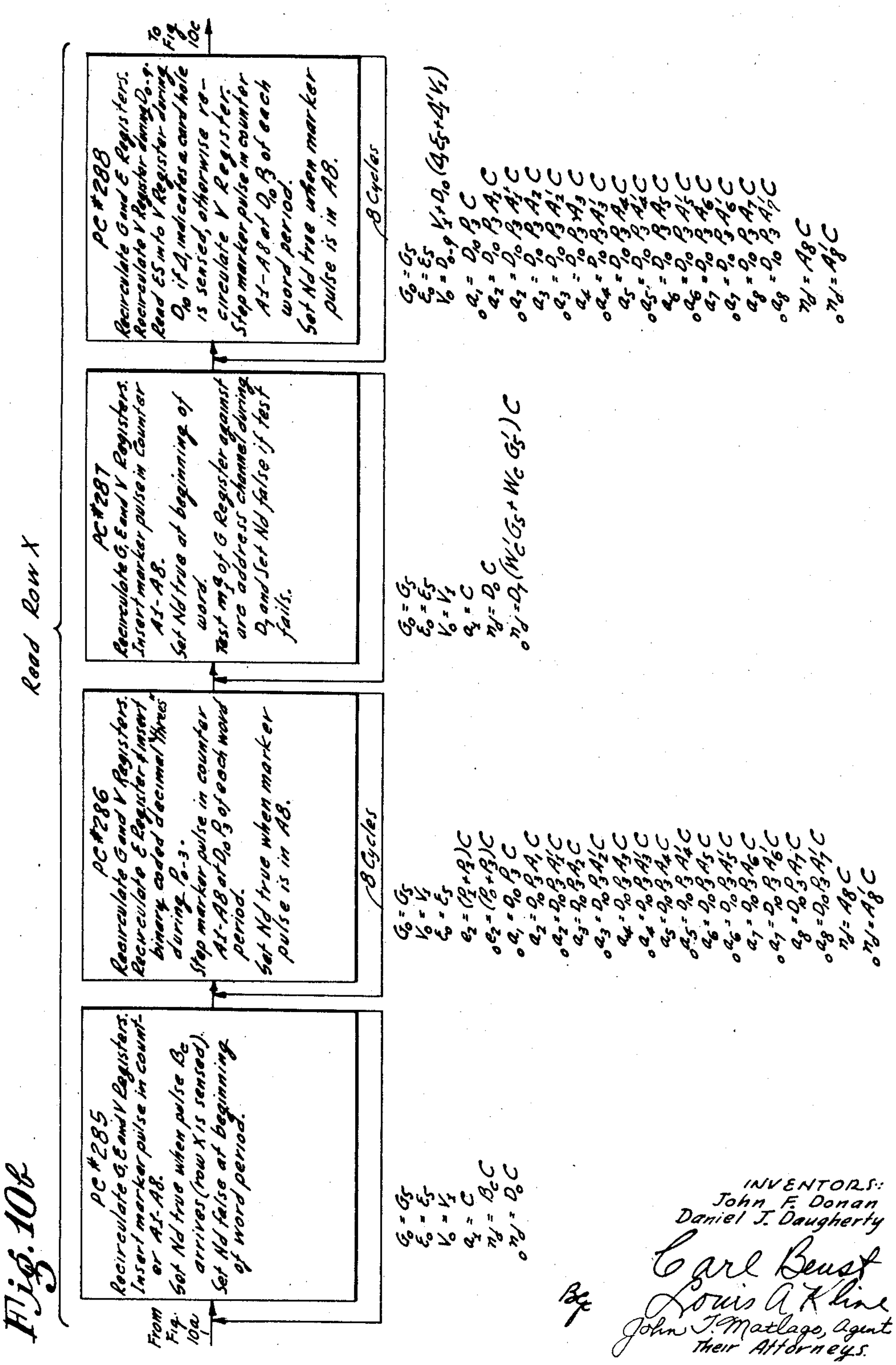
Figure 10C:
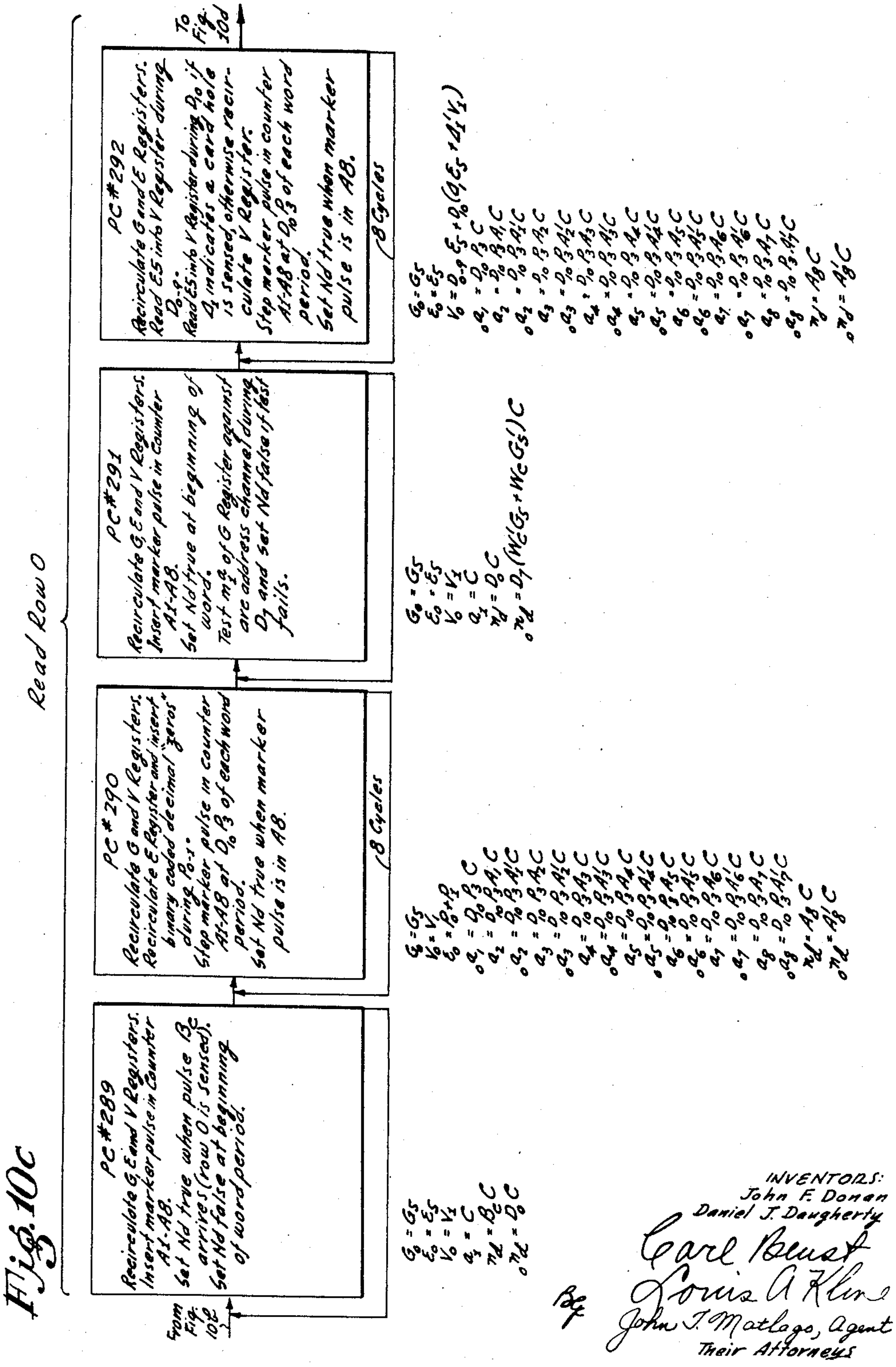
Figure 10D:
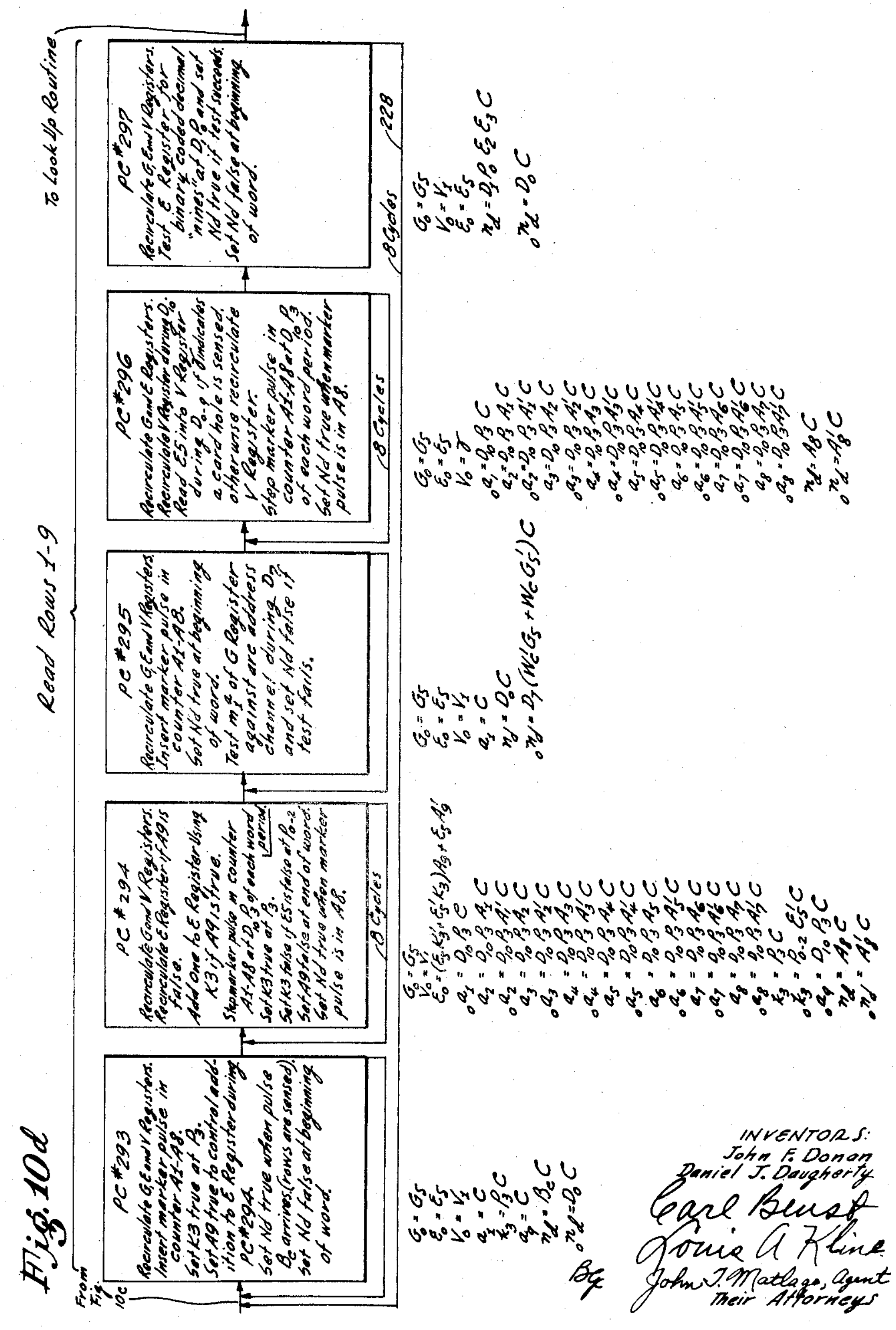
Figure 11A:
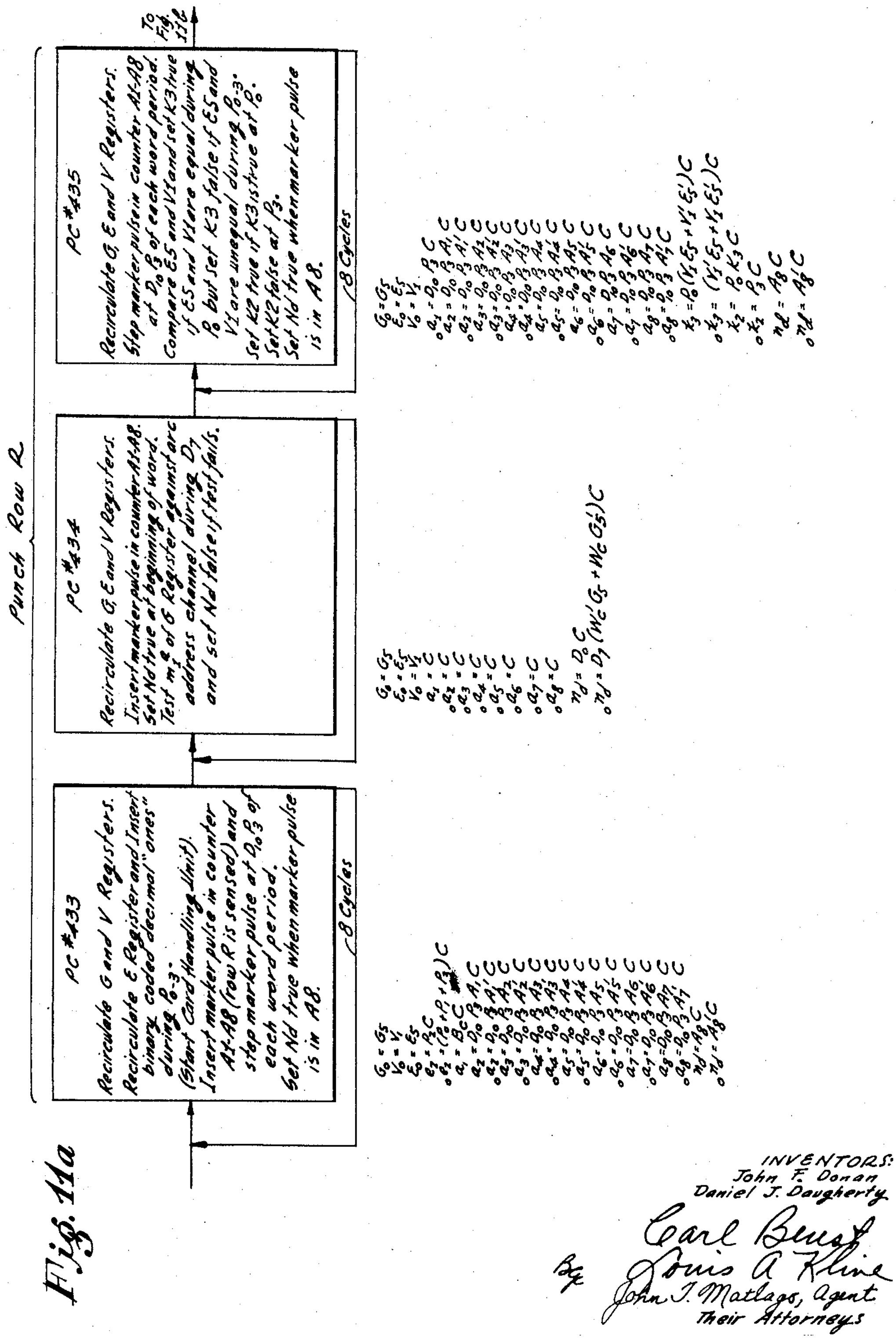
Figure 11E:
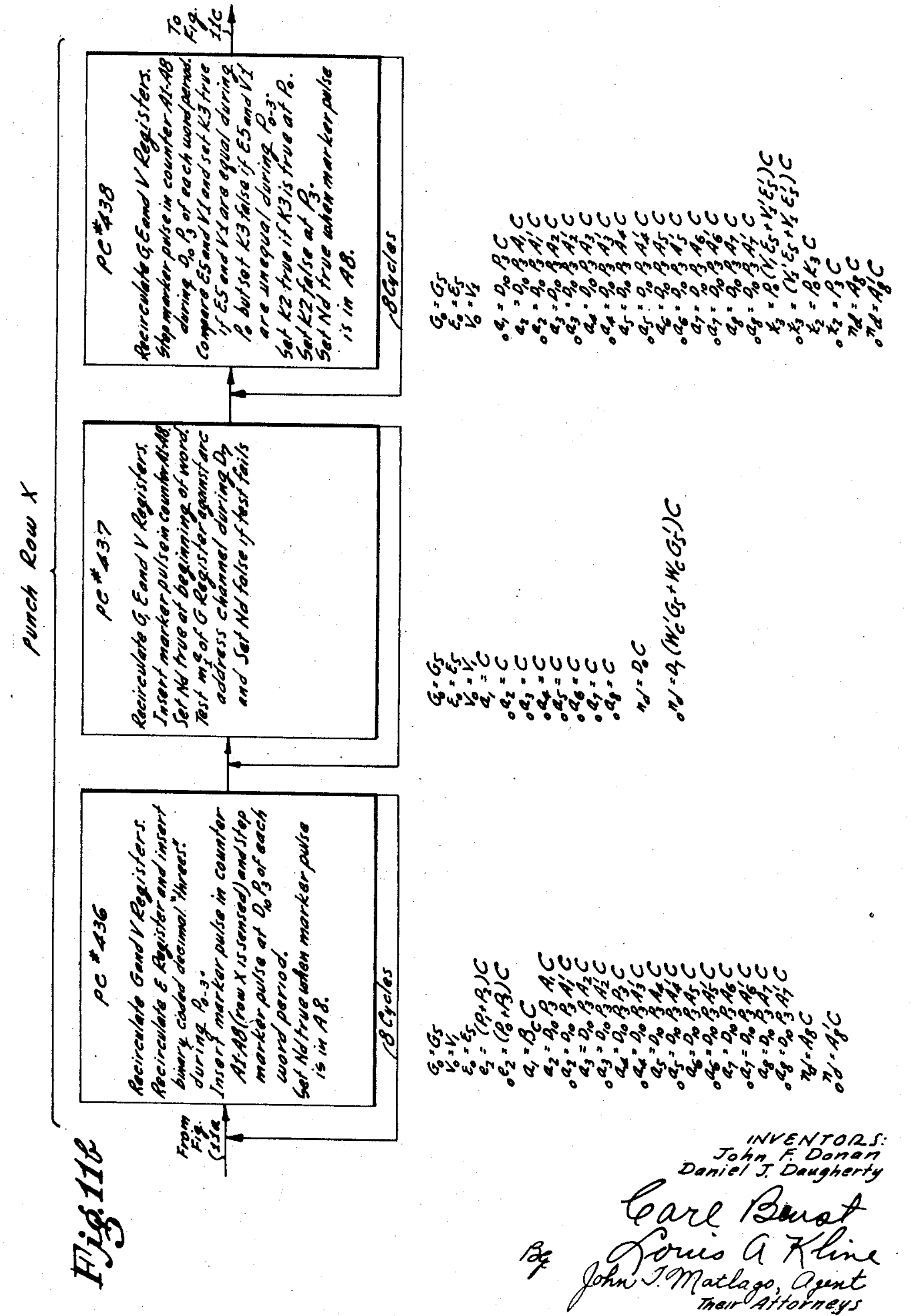
Figure 11C:
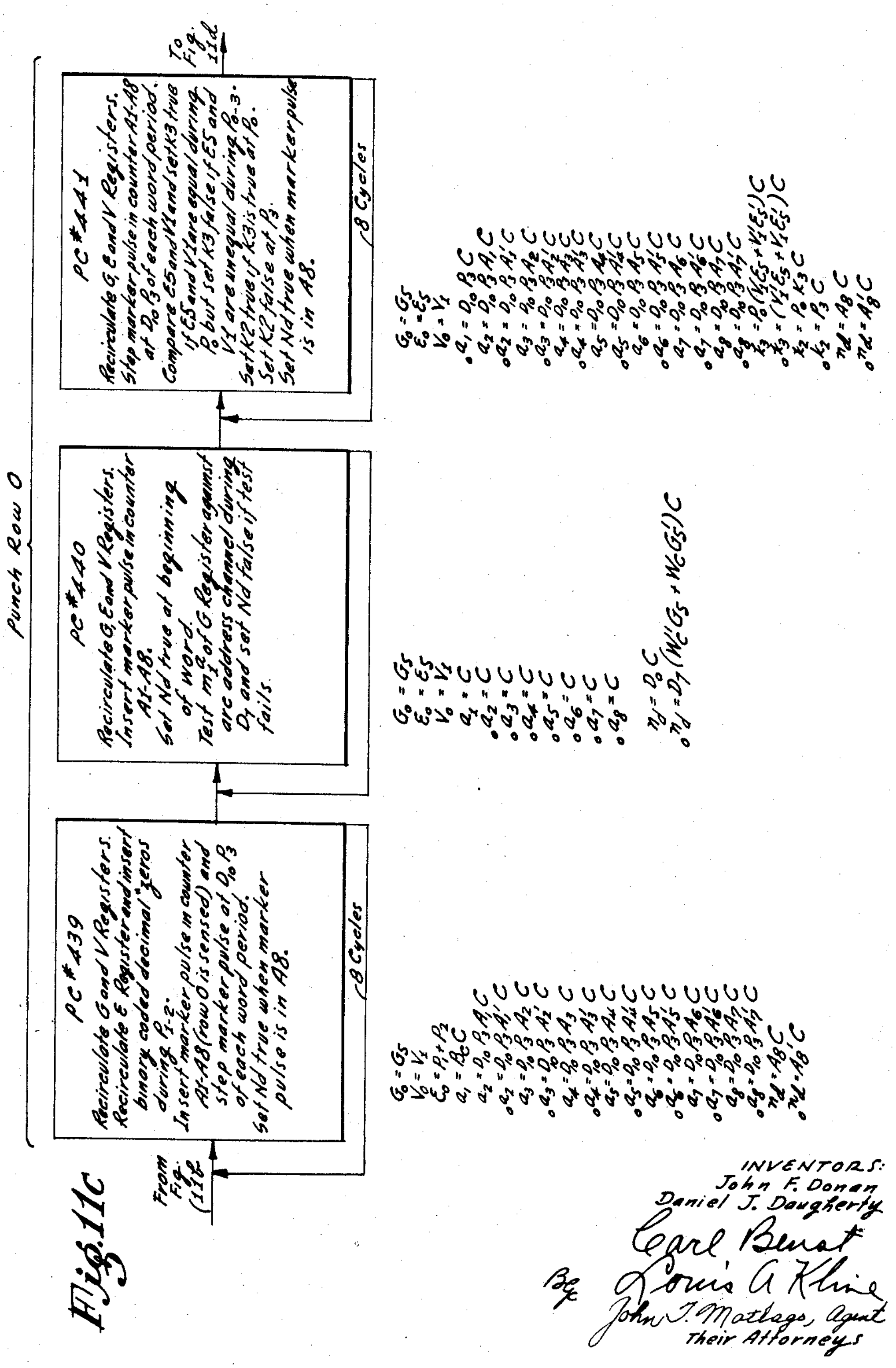
Figure 11D:
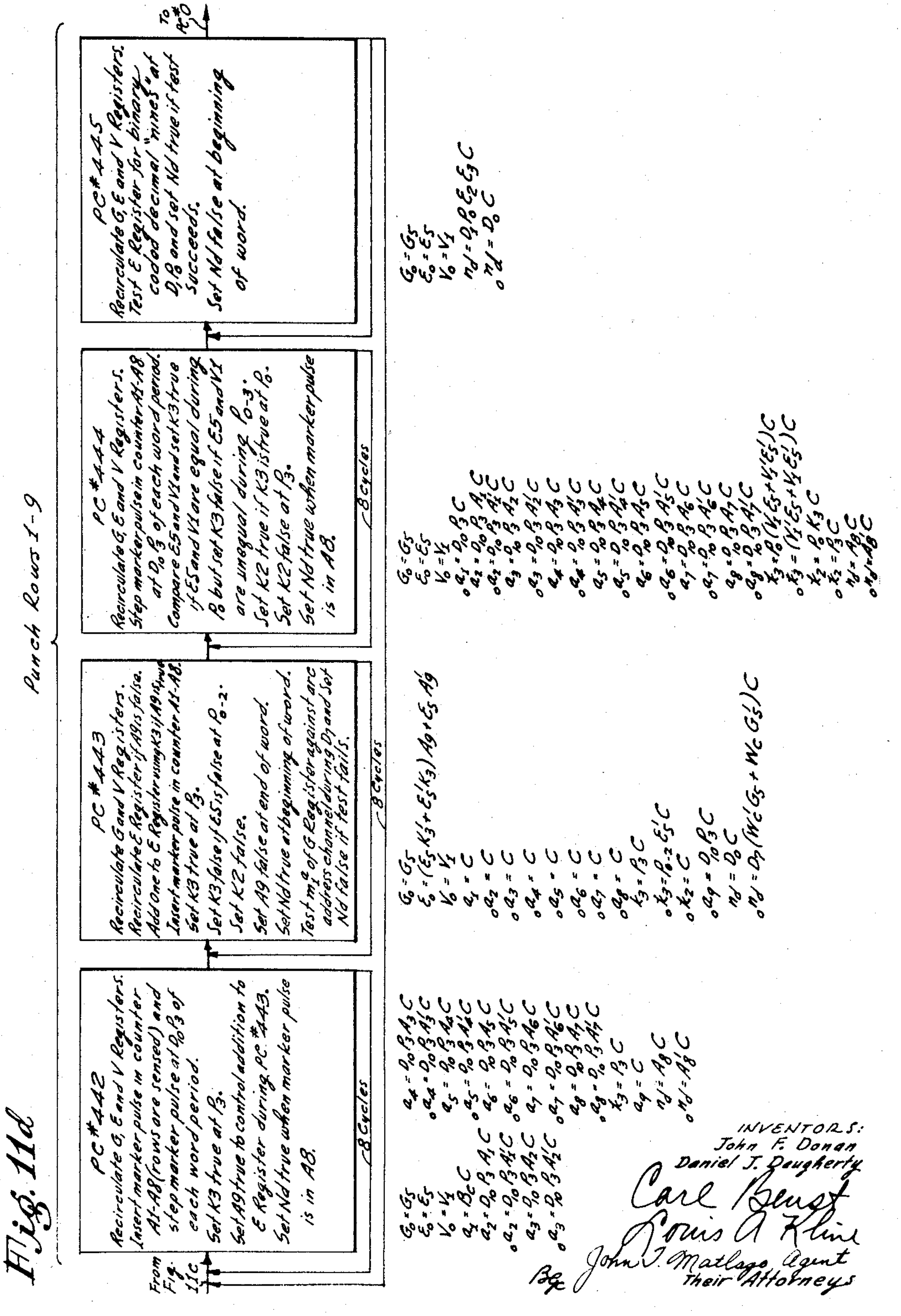

Flip-flops A9 and K3 are involved in the operations of Figs. 10*d* and 11*d* which add a unit to the E register.

The state of flip-flop K2 enters into the thyratron firing equations during the "card punch" routine described in connection with Figs. 11*a* to 11*d*.

It should be understood that information in all flip-flops is synchronized by the clock pulses before being made available to diode network 137.

Still with reference to Fig. 5, the action of diode network 137 in effectively interconnecting the registers of the computer to perform the operations of which the computer is capable will next be described.

It should be understood that the information picked up from, for example, the channel of E register 117 on drum 101 by flip-flop E1 is synchronized with clock periods. This information, on successive clock pulses, is stepped along through flip-flops E2 to E5 and is supplied to diode network 137, which, in response to this output as well as to other sources of two level potential shown feeding thereinto, generates an output $E_0$ which is stepped into flip-flop E*r* and thence back onto drum 101. After the delay, depending on the spacing of record and read heads 118 and 120, respectively, on drum 101, this information again appears in flip-flop E1. The loop thus defined represents a delay of one word period in the case of the E and G registers. However, for the V buffer register, the delay is ten word periods, accomplished, as shown in Fig. 1, by an increased spacing between record and read heads on the channel of V register 201 on drum 101.

Fig. 5 also indicates that information may be received by diode network 137 in the form of brush propositions $B_{1-1}$, $B_{1-2}$, . . . $B_{8-10}$ from card handling unit 205 as a record card is being read. When a hole in a card is sensed by a brush in card handling unit 205, the corresponding brush proposition is made effective as an input diode network 137, which connects proposition $V_0$ to follow the output of flip-flop E5, thereby transferring the present content of the E register to the buffer register. With reference to punching a card to correspond with information in the V buffer register, Fig. 5 shows that thyratron firing propositions $T_{1-1}$, $T_{1-2}$, . . . $T_{8-10}$ are generated by diode network 137 and supplied to card handling unit 205. Arithmetic unit 103 performs a digit-by-digit comparison between the information passing through flip-flop V1 in the V buffer register and the present content of the E register as represented by the state of flip-flop E5, and, if they are identical, causes the thyratron firing proposition corresponding to the digit position to be effective; firing of the thyratron energizes a relay which imparts motion to a card punch.

In the present computer the processes performed are all divided into sequential step or time periods of one word length. This is the time required for information in the G and E registers to recirculate once through arithmetic unit 103. Thus, each step operation defines a fixed serial operation performed by diode network 137 in arithmetic unit 103 during a word period.

It is the function of program counter 105 to render certain networks operable during each word period so as to accomplish each of these step operations. Accordingly, each output count signal, #0, #1, etc., of program counter 105 selects, i.e., renders operable, certain circuits of diode network 137 which respond to the desired inputs during each of the 44 clock periods of a word to generate the desired output propositions.

Still with reference to Fig. 5, the cycle of 44 clock periods comprising a word period is determined by the timing circuits feeding into the left of diode network 137. These circuits include the clock pulses C, signals from D counter 125 and signals from P counter 124. The counter outputs operate to break up the period of a word to render certain circuits effective only during certain portions of the word. In this way, the coded information in various positions of a word can be operated upon according to its significance.

The content of program counter 105 is changed precisely at the end of each word period as directed by the state of flip-flop N*d* at $D_{10}P_3$ to cause other circuits to become operable during the next word period. Thus, Fig. 5 shows that program counter 105 feeds its outputs into diode network 137 and is in turn controlled by output 206 from flip-flop N*d* controlled by diode network 137. Reference to Figs. 10*a* to 10*d* and 11*a* to 11*d* will clarify the action of program counter 105. These figures present portions of the computer flow diagram relevant to the card read and card punch processes and show how the step operations are arranged in sequence to perform the coded commands "card read" and "card punch" when programmed in the computer by the operator. As noted in Fig. 10*a*, each of the step operations is represented in the flow diagram by a block identified by a number, such as PC#281, of program counter 105. Each such block represents diagrammatically a set of logical operations to be performed serially by diode network 137 on information passing through arithmetic unit 103 during a single word period. The flow diagram portions show how program counter 105 changes in content to automatically determine the order in which the one-word step operations are performed by the computer. The one-word step operations may repeat for several word times, depending on a binary decision; or one or another sequence may be carried out after a certain operation in a previous sequence causes a binary choice to be made. Generally, program counter 105 increases in content or "counts" in an orderly fashion as the one-word operations are sequenced from left to right on the flow diagrams. However, program counter 105 may have the same number content for more than one word period, i.e., program counter 105 may "stick" in a given number as indicated, for instance, by line 207 associated with block #281 (Fig. 10*a*). Furthermore, program counter 105 may "skip" from one number to another, as indicated, for example, when it skips from block #297 to #293 (line 228 of Fig. 10*d*).

As indicated in Fig. 10*a*, for example for block #281, whenever the horizontal output from a block is to be followed, program counter 105 counts to the next successive count. On the other hand, whenever a vertical output from a word block is to be followed, program counter 105 may be controlled so as to stick in the same count or skip to a different count not the next in succession.

It is the state of flip-flop N*d* (Fig. 9) at the end, or $D_{10}P_3$ position, of a word period, that determines which of the two courses program counter 105 will follow. If flip-flop N*d* is true at $D_{10}P_3$, program counter 105 will count to the next higher number and the horizontal output from the block will be followed; if flip-flop N*d* is false at $D_{10}P_3$, program counter 105 will stick or skip and the vertical output from the block will be followed. The state of flip-flop N*d* at $D_{10}P_3$ is the result of a number of conditional processes one of which occurs during every word period and which will be presented hereinafter.

It will be further noted from Figs. 10*a* to 10*d* and 11*a* to 11*d* that a different program number is assigned to each step operation as it comes up in the flow diagram although it may require the same computer activity as some other preceding or subsequent step operation. Thus, from Figs. 10*a*, 10*c* and 10*d*, it is seen that PC#283, PC#291 and PC#295 are identical in content and, from Figs. 11*a* to 11*c*, it is seen that PC#434, PC#437 and PC#440 are also identical in content.

Returning again to Fig. 1, the circuitry corresponding to a particular count of program counter 105, as is well known in the art, is made effective in accordance with the states of the flip-flops N1 through N9. The arrangement adopted by the program counter is defined by trigger logical equations for each of the grids of flip-flops N1 through N9 in accordance with the various functions to be performed. The flip-flops are interconnected by a logical counting network causing them to operate as a binary counter whose outputs indicate PC#'s. Since flip-flop N*d* is controlled in turn by circuitry of arithmetic unit 103, it is apparent that mutual control occurs between program counter 105 and arithmetic unit 103.

It has been pointed out that all memory heads supply information to gating unit 104. More specifically, the outputs from all memory heads are fed simultaneously into gating unit 104 where only one of such outputs is selected at a time in accordance with signals from arithmetic unit 103 received over gate input line 127. The selected head output is transmitted from gating unit 104 via gate output line 128 to arithmetic unit 103.

Before considering further features of the computer circuitry concerned with the present invention, the convention of the logical methods employed herein will first be broadly outlined.

Logical propositions may be considered to be represented in circuitry by the states assumed by bistable state circuits having two input lines and two output lines. The arrangement of such a bistable state circuit as used in the present invention will be explained by reference to Fig. 6. This circuit is designated as flip-flop A8 and its function in the circuitry of the present invention will be described hereinafter. This flip-flop circuit utilizes a pair of triode tubes such as tube 129 and tube 130. When the flip-flop is in the condition such that tube 130 is cut off and tube 129 is conducting, it is considered to be "true" (or the flip-flop is said to be storing a binary "1"). When the flip-flop is in its other condition wherein tube 130 is conducting and tube 129 is cut off, it is considered to be "false" (or the flip-flop is said to be storing a binary "0"). It is thus understood that a flip-flop is generating two terms. These terms are represented by the flip-flop output lines which are connected to the plates of the tubes and which are shown clamped at two operating potentials, +125 v. D.C. and +100 v. D.C. When the flip-flop is in a true state, the output line connected to tube 130 is at +125 v. D.C. while the output line connected to tube 129 is at +100 v. D.C. Similarly, when the flip-flop is in a false state, the output line connected to tube 129 is at +125 v. D.C., and the output line connected to tube 130 is at +100 v. D.C. In order to trigger the flip-flop, signals in the form of negative-going pulses are applied thereto on separate input lines coupled to the grid of each of the flip-flop tubes in accordance with the convention that the grid of tube 130 must be pulsed in order to trigger the flip-flop into its true state, and that the grid of tube 129 must be pulsed in order to trigger the flip-flop into its false state.

The nomenclature employed herein uses the combination of a capital letter followed by a numeral or small case letter for designating a proposition flip-flop (K3, E2, N*d*, etc.). The output of the flip-flop which is at the high D.C. voltage (+125 v.) when the proposition is true is characterized by the corresponding capital letter with the numeral or small case letter as a subscript ($K_3$, $E_2$, $N_d$, etc.); and the output which is at the high D.C. voltage when the proposition is false is similarly characterized except that a prime is affixed ($K_3'$, $E_2'$, $N_d'$, etc.). The true input of the flip-flop, i.e., the one which, when energized, renders the proposition true, is characterized by the corresponding small case letter with the associated numeral or small case letter as a subscript ($k_3$, $e_2$, $n_d$, etc.); the false input, i.e., the one which, when energized, renders the proposition false, is characterized similarly except that a subscript zero is prefixed (${}_0k_3$, ${}_0e_2$, ${}_0n_d$, etc.).

Figure 6:
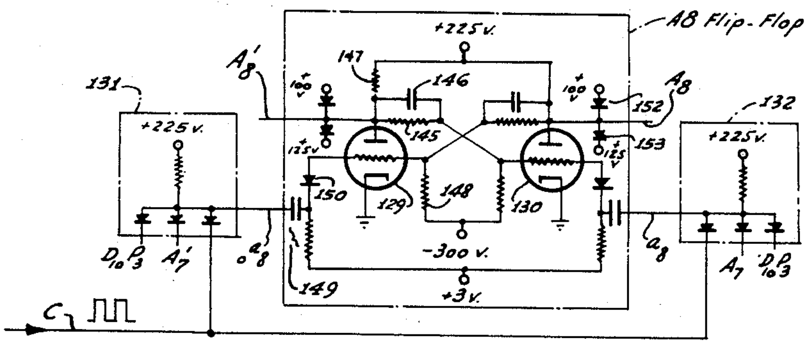
Fig. 6 is a schematic diagram of flip-flop A8 used in the ring counter.

Describing the arrangement of flip-flop A8 of Fig. 6 in greater detail, as shown, triodes 129 and 130 are arranged such that the plate of each is intercoupled to the grid of the other by a resistor in parallel with a capacitor, such as resistor 145 and capacitor 146. Each plate is provided with a separate load resistor, such as resistor 147, prior to connection to +225 v. D.C.; each grid is provided with a separate grid resistor, such as resistor 148, prior to connection to −300 v. D.C. bias; and each cathode is grounded. The input to the grids of triodes 129 and 130 is from gating circuits 131 and 132, respectively, during, for instance, PC#282 of Fig. 10*a*. The gating circuit outputs are differentiated and clipped, as for instance by differentiating circuit 149 and diode 150 associated with the grid of triode 129, such that negative pulses only are applied to the grids. The output from each triode is from the plate and is clamped between +100 v. D.C. and +125 v. D.C. by diodes, as for example diodes 152 and 153 connected to the plate output of triode 130.

As previously pointed out, the flip-flop circuit is triggered into its opposite state by applying a negative pulse to the grid of the conducting tube. If, for instance, the term $A_8$ is to be effective, it is necessary that the plate of triode 130 be high in potential. For this condition to attain, triode 130 must be cut off. Thus it is necessary to apply a negative pulse to the grid of triode 130 by providing an output from gate 132 (i.e., all of the input signals representative of terms $D_{10}P_3$, $A_7$, and C must be simultaneously at the high potential of +125 v. D.C.). At the end of the pulse period, the clock pulse will abruptly drop to the ineffective potential +100 v. D.C., which change in potential, after differentiation, will produce the requisite negative-going pulse. It follows that flip-flop A8 will enter pulse position $D_0P_0$ of the next word period in a true state. It should be noted that if flip-flop A8 were already true during $D_{10}P_3$, triode 130 would already be cut off and the negative pulse supplied by gate 132 would have no effect. In this case, the only way to change the state of flip-flop A8 would be to pulse the grid of triode 129 by providing an output from gate 131.

Figure 7:
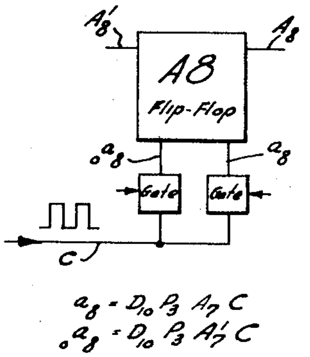
Fig. 7 is a block diagram of flip-flop A8 of Fig. 6 together with the logical equations defining its operation.

For the presentation of other flip-flop circuits, resort will be made to block diagrams to represent the schematic form, as illustrated by Fig. 7 for flip-flop A8, and the logical equations which define when and how the flip-flop circuit is to change will be shown below the block diagram. It will be noted that, for simplicity, the program counter terms effective for the $a_8$ and ${}_0a_8$ equations used as illustrative of nomenclature have been omitted.

Figure 8:
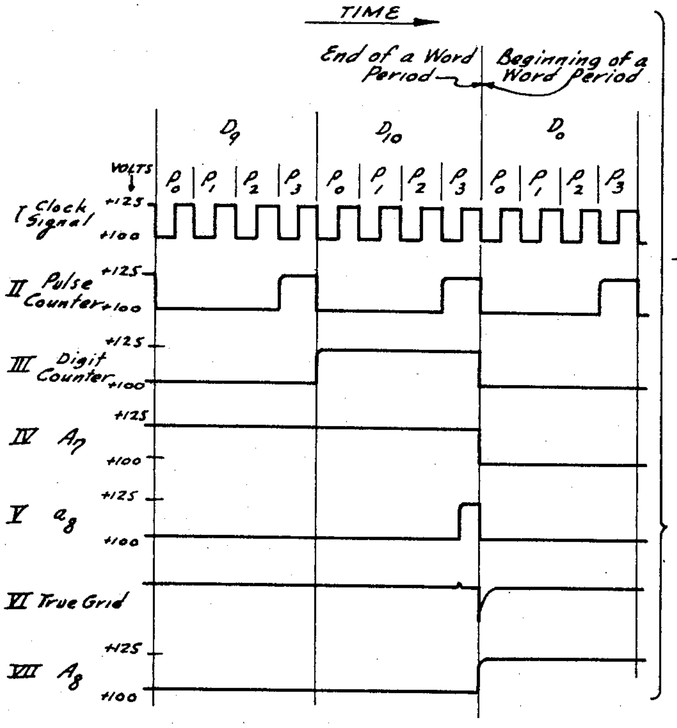
Fig. 8 is a graph of the waveforms concerned with the operation of flip-flop A8.

The action of flip-flop A8 in accordance with the equation shown will be further explained by the waveforms of Fig. 8. These graphs show how flip-flop A8 is triggered true from a prior false condition at the end of the time $D_{10}P_3$. Line I represents the clock signal C. It will be noted that a clock period P is measured from the trailing edge of one clock pulse C to the trailing edge of the succeeding clock pulse. Lines II and III show the states of the pulse counter 124 and digit counter 125, respectively, which together define the period $D_{10}P_3$ during which diode network 137 is arranged by program counter 105 to make flip-flop A8 responsive to clock signal trigger pulses which will take effect provided flip-flop A7 is true. It is seen that only during the latter half of the $D_{10}P_3$ pulse period is the clock signal C high. In line IV, flip-flop A7 is shown to be true until the end of the word period. It is thus during the latter half of the $D_{10}P_3$ pulse period that an effective true input $a_8$ (line V) will be generated. However, flip-flop A8 will be triggered true only by a negative-going pulse applied to its true grid. This pulse occurs, as shown in line VI, when the $a_8$ input sharply drops to the low potential at the end of $D_{10}P_3$. The small positive-going pulse at the beginning of the second half of $D_{10}P_3$ has no effect on flip-flop A8 since tube 130 (Fig. 6) is already conducting. Thus, as line VII shows, the output $A_8$ swings to a high potential at $D_0P_0$ of the next word period and flip-flop A8 will remain in the true state until triggered false in accordance with the equation ${}_0a_8=D_{10}P_3A_7'C$.

As previously stated, the computer logical operations are represented in the form of logical equations using the notation of Boolean algebra. A logical equation for the grid triggering of a flip-flop circuit consists of stating the terms which have to be effective, i.e., of a high potential during a clock period, in order that the flip-flop circuit will trigger into a particular state at the end of the clock period. Two operations are used in forming the equations. The first, "logical multiplication," means that all the terms in the particular product have to be of a high potential in order to make that product effective in a particular equation, and is accomplished in a circuit known as a logical product network. The second, "logical addition," means that at least one term of the sum has to be of a high potential in order to make that sum effective in a particular equation, and is accomplished in a circuit known as a logical sum network. Logical product and sum networks will next be described by reference to Fig. 9 which shows flip-flop N*d*, its triggering equations and circuitry.

Thus, for example, the equation effective during PCS4 and PCS7:

$$_0n_d = D_7(W_c'G_5 + W_cG_5')C$$

is interpreted as meaning that the N*d* flip-flop will be triggered into the false state at the end of the clock period during which the terms $D_7$ and $(W_c'G_5+W_cG_5')$ are at a high potential, where $(W_c'G_5+W_cG_5')$ itself will be of a high potential whenever both the terms $W_c'$ and $G_5$, or both the terms $W_c$ and $G_5'$ are simultaneously of a high potential.

Figure 9:
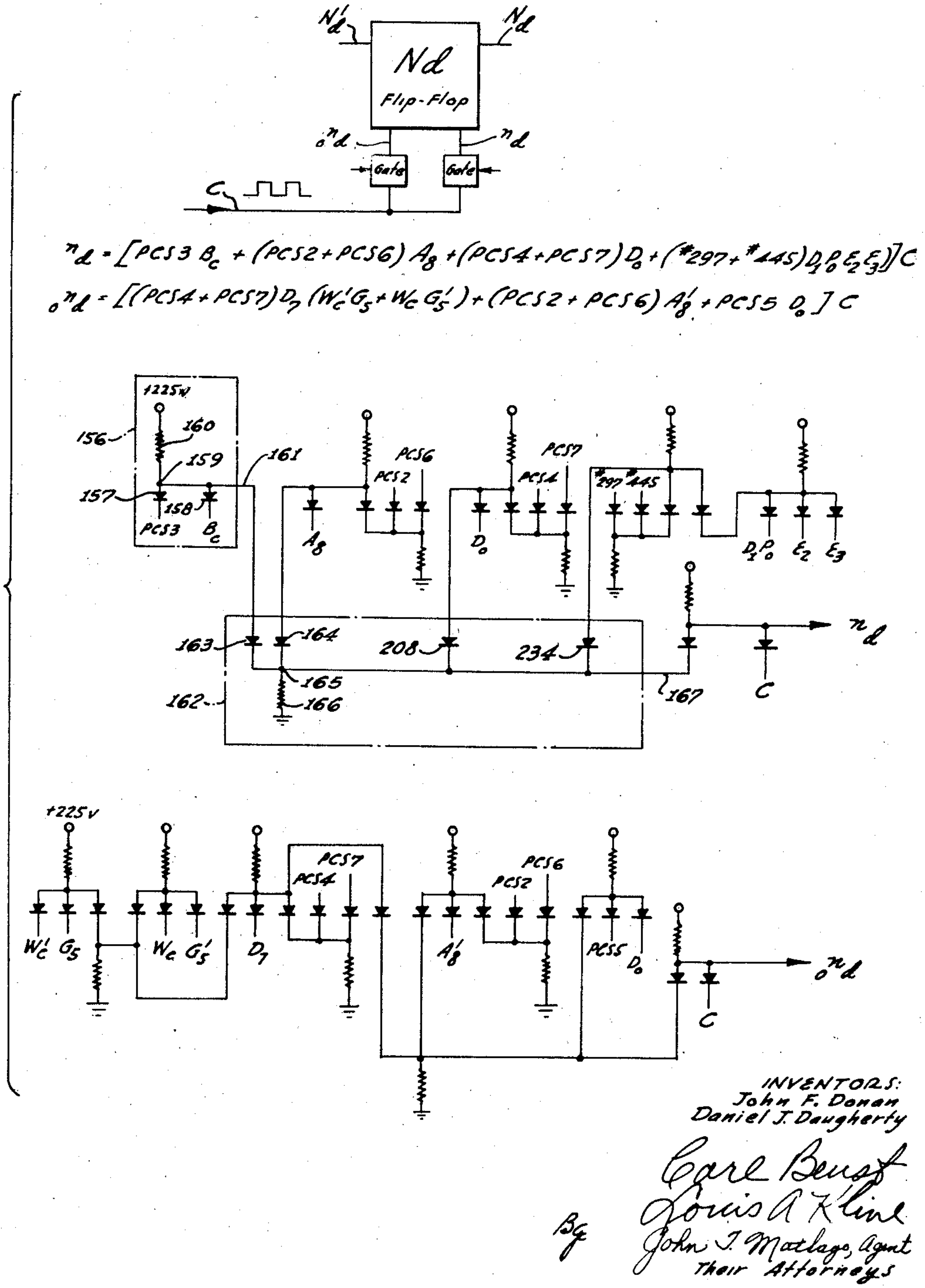
Fig. 9 shows the block diagram of flip-flop N*d* together with its logical equations and triggering diode networks.

Fig. 9 also shows the logical networks, namely, product networks such as 156, which are used to generate the trigger equations for flip-flop N*d*. Product network 156 is comprised of a pair of input crystal diodes 157 and 158 joined to a common junction 159 connected through a resistor 160 to the positive potential source of 225 v. These diodes are orientated such that whenever the input signals on both diodes are at the high potential of +125 v., the output 161, connected to common junction 159, is at the high potential of +125 v. Any time one or both of the diode inputs have the low signal potential of +100 v. thereon, output 161 is at this low signal potential.

Output 161, it is seen, comprises one input to a logical sum network 162. This sum network is comprised of four input crystal diodes 163, 164, 208, and 234 joined to a common junction 165 which is returned to ground through resistor 166. These diodes are orientated so that whenever the signal on any one of the inputs is at the high potential of +125 v., output 167 of the sum circuit, connected to the common junction 165, is at the high potential of +125 v. When none of the inputs is high in potential, output 167 is at the low potential of +100 v.

Reference will next be made to Figs. 10*a* to 10*d* and 11*a* to 11*d* which are portions of the computer flow diagram relevant to the card read and card punch routines of the present invention. These figures show how the step operations rendered effective by program counter 105 are arranged to transfer information between the record card and the V buffer register by employing the E register. As already pointed out, all sequential one-word-period steps into which computer processes are divided by program counter 105 are characterized by the effectuating of particular circuitry during particular PC# periods. There is a PC# to correspond to each of the output signals generated by the program counter 105 as already described, and a different PC# is assigned to each configuration although it may be identical to other prior or subsequent configurations.

As Figs. 10*a* to 10*d* and 11*a* to 11*d* indicate, within the rectangle representing each word time block, concise statements appear defining the activity during that word period. Below each of the blocks, logical equations are presented which define how the statements made within the rectangle are precisely stated in terms of the computer. It should be pointed out that not all of the propositions previously noted in connection with Fig. 5 as being generated by arithmetic diode network 137 are needed in order to accomplish the operations performed during a work period. Thus only those equations which are effective during a word period are listed below each word block. In the subsequent description, it may be considered that if one of the propositions shown feeding out of the right of diode network 137 of Fig. 5 is not generated during a word period, it is equal to zero, i.e., ineffective, for that word period.

It will be seen that certain operations and, therefore, certain forms of the logical equations occur in more than one word time block. As described, the scheme of the present invention provides circuitry for physically generating logical products and logical sums. Thus, by mere reference to an equation, the arrangement of the circuitry for generating the equation can be set up directly. However, it is not necessary for a logical combination of terms to be generated more than once. Thus, when a particular equation is used in several word time blocks, it is only necessary to provide circuitry for generating this equation once, and then to logically multiply the output with the PC#'s which define when it is to be operative. The simplification of the equations, and, therefore, diode networks by this means results in a reduction of the number of terms and components required. Thus, referring to Figs. 10*a* to 10*d*, it is noted that the equation $a_1=C$ occurs for PC#'s 281, 283, 285, 287, 289, 291, 293, and 295. These PC#'s are logically summed by the diode network shown in Fig. 12, generated as a separate function and designated simply as PCS1 (program counter sum 1). This function is employed as one of the inputs to the logical gates or mixers represented by the appropriate equations. The detail breakdown of the other program counter sums (PCS2 to PCS11) may be determined by reference to the equations shown in Fig. 12. Each of these equations are generated as an output of the composite logical network shown above them as previously described.

Prior to continuing with a discussion of Figs. 10*a* to 10*d*, the record card 233 (Fig. 1) contemplated for use with the present invention will be described with reference to specific examples of words punched therein as shown in Fig. 18.

The form of the record card 233 is well known in that it is provided with columns and rows of perforated positions. As indicated there are 80 columns numbered from 1 to 10 from left to right for each of the 8 words, and 12 rows labelled R, X, 0, 1 . . . 9 from top to bottom. In accordance with the system of the present invention as outlined in connection with Fig. 17, computer "words" are distinguished as to commands (Fig. 2) or numbers (Fig. 3) by binary coded decimal digits placed in the $D_0$ and $D_{10}$ positions of a word. The corresponding codes for the words on the cards are obtained by placement of holes in column 1, as shown by Fig. 18. Thus a positive number (e.g., word Two), coded in the computer as a 4 in $D_{10}$ and a 0 in $D_0$ (i.e., 40), is characterized on the card by no punch in any of the rows of column 1 of the word. In a similar manner, a negative number (e.g., word Three) is characterized by a punch in only row X of column 1 of the word. An instruction of group A–I shown in Fig. 17 (e.g., word Four) is characterized on the cards by punches in row R and in one of the rows 1 through 9 in column 1. An instruction of group J–R (e.g., word Five) is characterized by punches in row X and in one of the rows 1 through 9 in column 1. An instruction of group S–Z (e.g., word Six) is characterized by punches in row 0 and in one of the rows 2 through 9 in column 1. It is to be noted that, for simplicity, addresses have been omitted from the commands of words Four, Five, and Six, shown on the card, since information in columns 2 to 10 of all words is treated by the computer as numerals.

A broad outline of the sequence of operation of the computer for the card read and card punch routines will now be given. Initially, the program counter output is assumed to be in an idle operating conditon, PC#0, in which all circuits are inoperative except for the recirculation provided for in the E and G registers and the V buffer register.

First, with reference to the card read routine presented in Figs. 10*a* to 10*d*, it is initially assumed that the computer operator has already programmed into the computer a command directing the computer to read into storage registers of main memory channels 113 the content of record cards positioned in card handling unit 205. It is further assumed that the operator has placed into the G recirculating register, in periods $D_{7-9}$, the addresss of the storage register in the main memory which is to receive the first word of the card to be read. Upon initiating a start button (not shown) the computer will count out of the rest condition (PC#0) and sequence through a testing routine which will be successful for the code corresponding to the "card read" command and enter the "card read" routine of Figs. 10*a* to 10*d* which is concerned with transferring record card information into the computer.

Briefly, the sequence of Figs. 10*a* to 10*d* provides for transferring information from the record card to the V buffer register a row at a time starting with row R and ending with row 9 (Fig. 18). Rows R, X, and 0 of each card word are concerned with filling the $D_{10}$ period of each V buffer register word with the instruction codes (Fig. 17) called for by holes in the card in these rows, as already outlined. Thus, for row R, the V buffer register is filled with binary coded decimal "fours" and card handling unit 205 is started, thus advancing the card. When row R is positioned between brushes 216 and bus bar 217, a switch 219 is closed in card handling unit 205, thus causing a voltage to be generated and the E register to be filled with binary coded decimal "ones." Since the V buffer register is in continuous recirculation through arithmetic unit 103, the instant at which information is to be entered into the V buffer register must be identified. The standard employed for this identification is the time at which the decimal units digit of the arc address recirculating in the G register (period $D_7$) is equal to the decimal units digit of the arc addresses (period $D_7$) passing through flip-flop W*c*. Since the units digits of the arc addresses of the arc address channel each occur ten times for every drum revolution, it is obvious that the aforementioned equality will occur every 10 word periods, and this is also the time required for the V buffer register to recirculate once. Thus, information is allowed to enter the V buffer register only when the comparison exists, and the V buffer register is always entered at this time. The following 8 word periods are devoted to sensing holes in column 1 of row R of the card and, when a brush $B_{1-1}$, $B_{2-1}$, . . . $B_{8-1}$ is at +125 v., arranging diode network 137 such that proposition $V_0$ follows flip-flop E5, thereby transferring into period $D_{10}$ of the word period of the V buffer register the binary coded decimal "one" in the E register, which replaces the binary coded decimal "four."

Subsequently in a similar fashion the "ones" of the E register are replaced by "threes," row X of the card is read and, where a hole is present in column 1 of a card word, the "three" from the E register is caused to replace the "four" in period $D_{10}$ of the corresponding word of the V buffer register.

Before row 0 is read, the "threes" in the E register are replaced by "zeros." The process of reading row 0 is similar to those preceding except that the binary coded decimal "fours" in periods $D_{0-9}$ of the V register are replaced by the "zeros" of the E register during recirculation of these registers and the digits in period $D_{10}$ of the V register are similarly replaced only if the 0 row of the card word has a hole in column 1. After row 0 is sensed, no further changes are made in period $D_{10}$ of each V buffer register word, i.e., sensing of rows 1 through 9 is for the purpose of filling periods $D_{0-9}$ of the V buffer register.

The difference in procedure when reading rows 1 through 9 from that of reading rows R, X, and 0 resides in the addition of a unit to the E register when a row is sensed and testing the E register for a content of "nines" since the E register will contain "nines" when row 9 is read. The E register addition is accomplished using flip-flops K3 and A9 in a novel arrangement, to be discussed. When the test for "nines" in the E register is successful, the card read routine is complete.

The details of the card read routine will now be presented by specific reference to Figs. 10*a* to 10*d*.

Referring to PC#281 of Fig. 10*a*, the first statement made is that information in the G register is recirculated. This is represented by the equation $G_0=G_5$, as discussed in connection with Fig. 5. Thus the address in the G register is made available continuously. It will be noted that the $G_0$ equation is operative during the entire word period. Where such is the case, the timing term $D_{0-10}$ will not be included. It will also be noted that, for simplicity, the PC# during which an equation is effective has been omitted from the equation, although the PC# appears as a logical multiplier in the appropriate diode networks.

Next in block PC#281 it is stated that the V register is to be filled with binary-coded decimal fours during $P_{0-2}$. This is logically defined by the equation $$V_0=P_0+P_1+P_2$$

below the block. By continuously recirculating the V buffer register and simultaneously arranging diode network 137 to make proposition $V_0$ effective at the fall of clock pulses occurring during pulse positions $P_0$, $P_1$ and $P_2$ of each D period, the content of the V buffer register, which was previously zero, is changed to binary-coded fours in the excess 3 system, i.e. 0111 is placed in each D period of the V buffer register, as shown in the row of the table of Fig. 19 labelled "After PC#281." The purpose of this is to prepare for identification in the $D_{10}$ period of the card words to be received by the computer as commands or numbers. As outlined in connection with Figs. 2 and 17, computer words may be either commands or numbers. However, the information received from the record card is a sequence of pulses positioned time wise to represent numerals. This sequence must first be examined to determine the type of word being received. In accordance with the scheme of the present invention, the assumption is made that all card words to be received will be positive numbers as in Fig. 17. Thus, a "four" must occupy the $D_{10}$ period of each word in the V buffer register. If the word being read is otherwise, a "four" in any D period of the V buffer register will be changed when the appropriate row of the card is read.

The next statement made in PC#281 indicates that flip-flops A1 to A8 inclusive are arranged to function as a counter, wherein the state of each flip-flop is stepped into succeeding flip-flops in the counter each word period. It will be understood that the flip-flop arrangement is a parallel one in that a clock pulse generated by revolving drum 101 is applied to all flip-flop inputs so as to cause all changes to occur simultaneously and in synchronism with the clock periods. In Fig. 30 are shown the block diagrams, composite diode networks and logical equations for flip-flops A1 to A8. In brief, during PC#281 flip-flops A1 to A8 are arranged such that flip-flop A1 is true and the others are false by the equations $a_1=C$, ${}_0a_2=C$, . . . ${}_0a_8=C$, and this condition is maintained while the computer is in PC#281.

The next statement in the block defining PC#281 indicates that motor 209 of card handling unit 205 is energized in PC#281. Returning momentarily to Fig. 1, it will be seen that the card handling unit 205 is arranged to feed the card 233 in a straight path extending transversely relative to its length as shown by the arrow at the center of the card. This motion is imparted by motor 209 operating through means to cause driving rollers 210 and 211 to rotate in the direction shown by arrows at their ends and to cause idler rollers 212 to rotate as shown. Motor 209 is started when the computer enters the operation indicated in word block PC#281 by the circuit shown in Fig. 13. This circuit shows that any time either of the outputs PC#281 or PC#433 are energized, a signal is generated on output 213 of a sum diode network 214, which, after being amplified in tube 215, is used for initiating the motor circuit of card handling unit 205. It is in this way that the record card 233 is positioned so that its rows may be read successively by brushes 216 and bus bar 217 commencing with the top row, R (see Fig. 18), of card 233.

The next statement made in PC#281 is that flip-flop N*d* enters therein in a false state. As previously noted, the function of flip-flop N*d* is to signal program counter 105 to count in an orderly fashion or to deviate from this count. It should be understood that the choice as to how program counter 105 should change is derived as a result of information either received or generated during each word period and set up in flip-flop N*d*. In the present instance, the word block immediately preceding PC#281 is not relevant to the card read routine excepting that this word block had caused flip-flop N*d* to be triggered false. Flip-flop N*d*, during PC#281, will remain false, and the activity of PC#281 will be repeated during successive word periods until flip-flop N*d* is triggered true.

The next statement of PC#281 indicates that the computer will enter PC#282 when the record card is positioned such that row R of the card is sensed by brushes 216 and bus bar 217. Returning again to Fig. 1, it is seen that output 218 from arithmetic unit 103 connects to normally-open switch 219 and that the latter connects to bus bar 217 and input 220 which returns to arithmetic unit 103. Switch 219 is closed when its lever arm 221 is moved downwardly by projections such as projection 222, on gear 223. It will be observed that gear 223 is rotated continuously with roller 211 by motor 209. Projections 222 on gear 223 are arranged to close switch 219 when the record card is positioned such that a row thereon is sensed by brushes 216 and bus bar 217. Thus, there are twelve projections 222 to correspond to the twelve rows on the record card. Line 218 carries energizing voltage of +125 v. from arithmetic unit 103, which passes through switch 219 when a card row is properly positioned opposite brushes 216, to junction 225 and bus bar 217 and returns to arithmetic unit 103 via line 220. As mentioned previously in connection with clock line 126, lines shown in Fig. 1 may actually comprise more than mere connections and consist of components to shape or alter voltages to make them more suitable for an intended purpose. Line 220 thus actually comprises the circuitry of Fig. 14 which shows a clamped one-shot multi-vibrator. Briefly, the voltage on line 220 is clamped and differentiated by the components collectively designated 240 and applied to tube 226 which emits a positive-going pulse typical of this type of multi-vibrator. The pulse is clamped, as shown, between the levels +125 v. and +100 v. by diodes 237 and 238 and returned to arithmetic unit 103 as pulse $B_c$, the receipt of which indicates that a card row is in position to be sensed; and returning once more to Fig. 10*a*, it is now evident that pulse $B_c$ signals the computer to count out of PC#281. This is accomplished by triggering flip-flop N*d* true ($n_d=B_cC$) at the fall of the first clock pulse which occurs during the pulse $B_c$. It is in this way that a delay is provided by the computer to inhibit its functional operation until card handling unit 205 indicates readiness of a record card row for sensing.

The function of PC#282 is primarily to furnish a second delay of 8 word periods to insure that the pulse $B_c$ has reached its maximum voltage level before brushes are sensed. It is to be noted that the operating speed of the computer is sufficiently high to read all 80 brushes 216 while switch 219 is closed and bus bar 217 is energized. Since the wave form of pulse $B_c$ is dependent on the operating qualities of switch 219 which, as is conceivable, may cause a gradual rise of the leading edge of pulse $B_c$, it is desirable to delay the reading of brushes 216 until it is ascertained that pulse $B_c$ will be at the effective voltage level of +125 v. at which the computer operates. The delay is accomplished by counter flip-flops A1 through A8 operating in sequence as already described, and by providing for counting out of PC#282 when flip-flop A8 goes true: $n_d=A_8C$.

As described, in PC#282, both the G and V buffer registers are recirculated, the former with its content of the address of the memory storage register to receive the first record card word and the latter filled with "fours."

Figure 24:
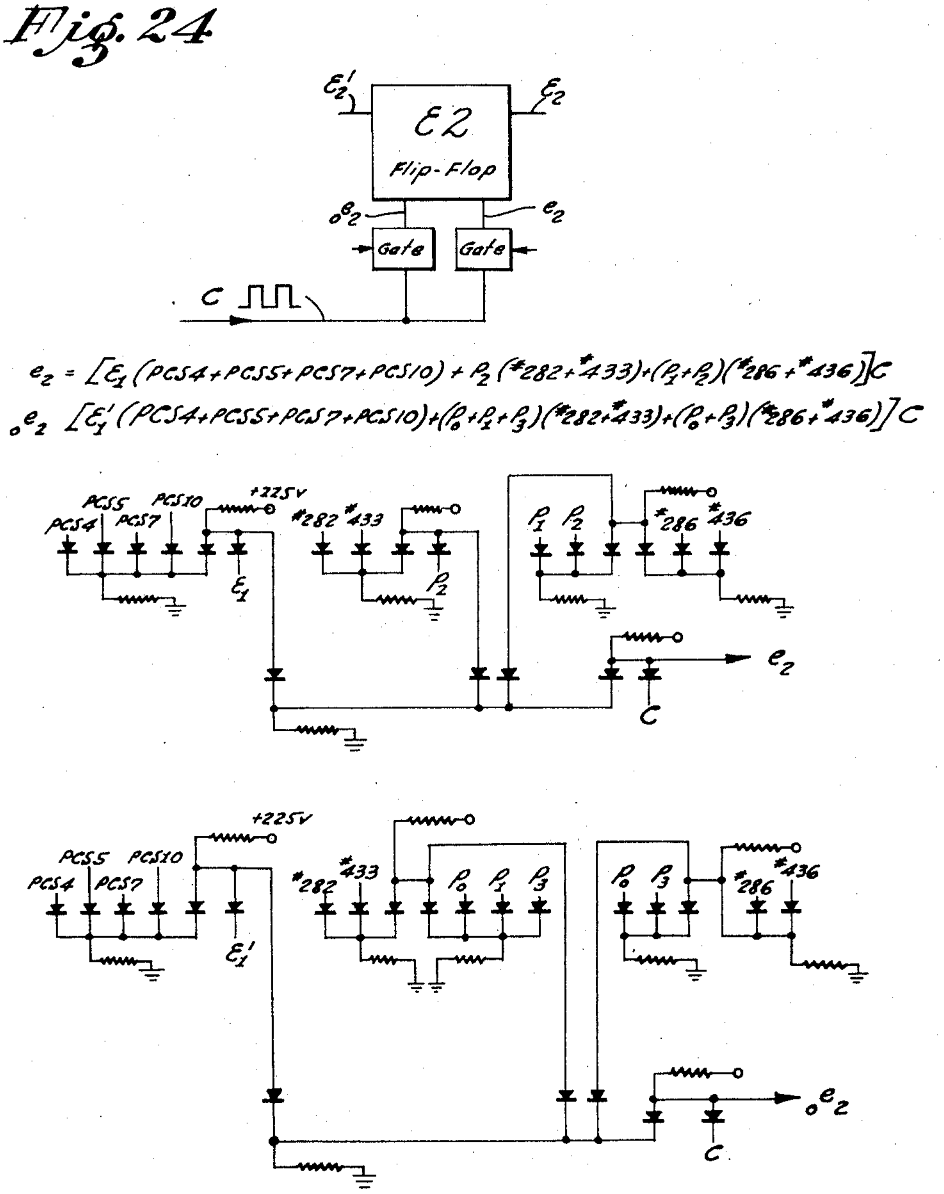

An additional function of PC#282 is to fill the E register with binary coded decimal "ones" (0100). This is accomplished by the equations $e_2=P_2C$ and $${}_0e_2=(P_0+P_1+P_3)C$$

in the same way that the V buffer register was filled with "fours" in PC#281 except that entrance into the E register is via flip-flop E2 as previously discussed in connection with Fig. 5. The reason for filling the E register with "ones" is to provide for the possibility that a card word would be an instruction in the group A–I in which case the content of the period $D_{10}$ of the V buffer register corresponding to that word must be changed from "four" to "one" when row R of the card is sensed (see Fig. 17 and word Four of Figs. 18 and 19). The block diagram, logical equations, and triggering diode networks for flip-flop E2 are shown in Fig. 24.

In PC#283 again, the G, E, and V buffer registers are recirculated. Also flip-flops A1 to A8 are set in readiness to count as before. However, for this purpose, since, on leaving PC#282, flip-flops A2 to A8 were false, it is only necessary to trigger flip-flop A1 true: $a_1=C$.

Also in PC#283, it will be noted that the V buffer register is synchronized. This is accomplished by setting flip flop N*d* true at the beginning of the word period as indicated by logical equation $n_d=D_0C$, so as to cause the program counter 105 to count to PC#284, thus presuming synchronization, but triggering flip-flop N*d* false so as to cause the computer to repeat PC#283 during period $D_7$, ${}_0n_d=D_7(W_c'G_5+W_cG_5')C$, if the presumption fails. It is essential that the V buffer register be synchronized. It has already been pointed out in connection with Fig. 5 that arithmetic unit 103 simultaneously is receiving information synchronized by clock pulses from several sources including the G register and the arc address channel on drum 101. This information is utilized as it appears in flip-flops G5 and W*c*. A comparison is made, digit by digit, of the units digits of the arc addresses passing through flip-flop W*c* and the units digit of the arc address of the storage register to contain the first card word passing through flip-flop G5. The comparison is made during period $D_7$ which, as shown in Figs. 2 and 4, contains the units digits of the arc addresses; and if at least one of the corresponding binary digits of each are unequal, flip-flop N*d* is triggered false, thus causing program counter 105 to remain unchanged. In other words, the ${}_0n_d$ equation states that the status of flip-flop N*d* at $D_{10}P_3$ reflects the success or failure of the comparison. Flip-flop N*d* is to be triggered false during period $D_7$ at the end of a clock pulse if outputs $W_c$ and $G_5$ were not both high or both low during the clock pulse, otherwise flip-flop N*d* is to remain true; but once flip-flop N*d* is triggered false, it remains false throughout the remainder of the word period.

It is in PC#284 that, for the first time in the routine, a transfer may occur from the E register to the V buffer register in accordance with whether or not an effective voltage is sensed on one of the 8 brushes 216 sensing column 1, respectively, of the 8 words on the card 233; namely, brushes $B_{1-1}$, $B_{2-1}$, . . . $B_{8-1}$.

Firstly, in PC#284 it will be noted that, as before, the G and E registers are recirculated and the counter A1–A8 is arranged to count 8 word periods, during each one of which the brushes corresponding to the R row of one of the consecutive words on the card are being sensed. Also, it is noted that flip-flop N*d* is again arranged to follow flip-flop A8 of the counter so as to cause program counter 105 to arrange for the count to PC#285 when 8 word periods elapse in PC#284. The scheme by which the $D_{10}$ periods of the V buffer register are filled is represented by the equation:

$$V_0=D_{0-9}V_1+D_{10}(\Delta_1E_5+\Delta_1'V_1)$$

The equation makes two statements. The first, $$V_0=D_{0-9}V_1$$

is that the V buffer register is to be recirculated during periods $D_{0-9}$, thus retaining in these periods the content "four." The second, $V_0=D_{10}(\Delta_1E_5+\Delta_1'V_1)$, is that if a brush sensed during period $D_{10}$ is at the effective voltage of +125 v., proposition $V_0$ will follow the state of flip-flop E5; but if the brush is at the ineffective voltage of +100 v., proposition $V_0$ will follow flip-flop V1 (i.e., recirculation in the V buffer register). The generic symbol employed to represent logical propositions in this second statement is $\Delta$, generated by a diode network shown in Fig. 16. $\Delta_1$, which enters the above $V_0$ equation, symbolizes that, although all 10 brushes of a card word are sensed, only the brushes corresponding to periods $D_{10}$ of the word periods in the buffer register can provide an output $B_{1-1}$, $B_{2-1}$, . . . $B_{8-1}$ effective to make proposition $V_0$ follow flip-flop E5. It should be apparent that the sequence of reading a record card is that the words are read in ascending numerical order, but that brushes for each row of a word are sensed from right to left for the view shown in Fig. 1. Thus, it follows that, for the example of word Four of Fig. 18, proposition $B_{4-1}$ will be effective since column 1 row R of word Four has a hole therein, and that proposition $B_{4-1}$ will be effective only during period $D_{10}$ of the word period. The status of counter flip-flops A1 to A8 appears in the $\Delta$ equations to insure that the proper card word only can cause a transfer since during each word period of PC#284, all eight card words are sensed, i.e., during, for example, the fourth word period in PC#284, all 80 brushes are sensed, but effective voltages on brushes corresponding to word Four only of the card can affect proposition $V_0$, because flip-flop A4 is true only for the fourth word period. It will also be noted that not only is the term $\Delta_1$ generated, but also its prime, the term $\Delta_1'$, is generated by means of inverter stage 227 as is well known in the art.

It is reiterated that, after the activity of PC#284 is repeated for 8 word periods, all information of row R of the record card is present in the computer V buffer register $D_{10}$ periods and entrance into PC#285 (Fig. 10*b*) is effectuated. Returning to the example shown in Figs. 18 and 19, it is seen that only word Four is punched in row R column 1 and thus word Four of the buffer register, as shown in the $D_{10}$ period, is changed from "four" to "one," thus evidencing that word Four is an instruction of the group A–I.

PC#285 initiates the process of reading row X of the record card into the V buffer register. The statements and equations of PC#285 have already been discussed in connection with PC#'s 281 to 284. As before, the computer is sequenced into PC#286 when the receipt of pulse $B_c$ indicates that the card is properly positioned in card handling unit 205 for reading row X.

Similarity of PC#286 to PC#282 is apparent. The activity herein is the same except that the E register is filled with "threes" (0110, Fig. 15), preparatory to transferring card punches in row X during period $D_{10}$ in the event a card word is an instruction of the group J–R or a negative number (Fig. 17). Again the E register is entered via flip-flop E2: $e_2=(P_1+P_2)C$ and $_0e_2=(P_0+P_3)C$.

Similar to PC#283, the main purpose of PC#287 is to again synchronize the V buffer register in accordance with the period $D_7$ content of the G register and the arc addresses passing through flip-flop Wc.

PC#288 is identical in activity to PC#284 and the same equations hold therefor. In PC#288, row X of the record card is read into the V buffer register. Returning to the examples of Figs. 18 and 19, it is seen that word Five of Fig. 18 contains a punch in row X column 1 and thus is identified by the computer as either a negative number or an instruction of group J–R (Fig. 17). Consequently, when the hole is sensed, the brush pulse $B_{5-1}$ is effective to transfer the E register content ("three") set in PC#286 to the V buffer register, as shown for period $D_{10}$ of word Five of Fig. 19.

Sensing and transfer of row 0 of the record card is accomplished in PC#'s 289 to 292 (Fig. 10*c*) and similarity of these word time blocks to PC#'s 285 to 288 is apparent, except that in PC#290, the E register content is changed from "threes" to "zeros" by means of the equation $E_0=P_0+P_1$ and, during PC#292, the $V_0$ equation arranges for transfer of the E register content ("zeros") to the V buffer register during all periods ($D_{0-10}$) except where a prior transfer during $D_{10}$ had already been made: $V_0=D_{0-9}E_5+D_{10}(\Delta_1E_5+\Delta_{1'}V_1)$. An example of this situation is shown for row 0 in Figs. 18 and 19, where it is seen that for the periods $D_{10}$, word Two remains "four" since column 1 had no prior hole, words Three and Five remains "three" since column 1 of these words were punched in row X, word Four remains "one" since column 1 thereof was punched in row R, word Six changes from "four" to "zero" since column 1 row 0 thereof is punched; and for periods $D_{0-9}$, all words are changed from "four" to "zero." At this time information from the record card columns 1 for each word is in corresponding words of the V buffer register in the $D_{10}$ periods; i.e., the filling of the $D_{10}$ periods is complete.

It now remains to likewise fill periods $D_{0-9}$ of the V buffer register in accordance with information in the record card columns. This is accomplished in PC#'s 293 to 297, of which a broad description will first be given.

The sequence of PC#'s 293 to 297 (Fig. 10*d*) is repeated once for each of the card rows remaining to be read, i.e., nine times. During each such time, the card is in position such that a row may be scanned; and after a delay to ascertain a suitable amplitude of pulse $B_c$, the E register content is arranged to correspond with the particular row to be sensed. All brushes are then sensed and, where a hole occurs, the E register content is transferred to the V buffer register. The E register is then tested for a content of "nines." If the test fails, the process is repeated and the succeeding row of the card is scanned. If the test succeeds, it is an indication that row 9 of the card has been scanned and the V buffer register is filled. The computer then enters a routine which transfers the V buffer register content to main memory 113 as taught by techniques established in the art and not described here.

Referring to PC#293, here, as before, the G and E registers and the V buffer registers are recirculated and counter A1–A8 is set up. Here also flip-flop K3, which is the means employed to effectuate the addition of a unit to the E register content, is set true for reasons which will be made apparent when PC#294 is discussed. Similarly, flip-flop A9 is here set true to prepare for PC#294. The function of flip-flop A9, as will be seen, is to inhibit the change in the E register content during PC#294 if entrance into PC#294 is not from PC#293 but due to program counter repeating PC#294, since it is desired that the E register content be not increased during every word period in which the computer is in PC#294 (8 word periods of PC#294 are merely a delay until the approximate center of pulse $B_c$ arrives) while it is desired that the E register content be increased each time the sequence from PC#293 to PC#297 is performed.

The activity in PC#294 has already been described except for that of the E register. It will be recalled that the E register had been filled with "zeros" (PC#290) and it is required that a unit be added to the E register prior to the scanning of each record card row from the first (row 1) to the last (row 9). The equation which represents the addition of a unit to the E register content is: $E_0=(E_5K_{3'}+E_{5'}K_3)A_9+E_5A_{9'}$. As shown, and from prior discussion in connection with Fig. 5, it should be understood that, as the E register recirculates with, for example the content of binary-coded decimal "zero" (0011), the least significant binary digit (1) of this content appears in flip-flop E5 during pulse position $P_0$, the next digit (1) appears during $P_1$, the next digit (0) appears during $P_2$, and the most significant digit (0) appears during $P_3$. It should also be understood that while proposition $E_0$ will follow flip-flop E5 during normal recirculation of the E register, proposition $E_0$ can be made a function of other flip-flops, such as flip-flop A9. Returning to the equation, it is seen that proposition $E_0$ will be high if one of the terms $$(E_5K_{3'}+E_{5'}K_3)A_9$$

or $E_5A_{9'}$ is high. Since flip-flop A9 was set true during PC#293, it is true throughout the first word period in PC#294 (flip-flop A9 is set false at $D_{10}P_3$ of each word period in PC#294: ${}_0a_9=D_{10}P_3C$). Thus, any change during this first word period must be accomplished by the term $(E_5K_{3'}+E_{5'}K_3)$ which holds for the true condition of flip-flop A9.

In order that a change be made from "zero" to "one," the content of the E register must be changed to 0 for the pulse position $P_0$. An examination of the term $(E_5K_{3'}+E_{5'}K_3)$ indicates that neither of the subterms therein are high when $P_0$ is entered: $E_5K_{3'}$ is low because flip-flop K3 enters PC#294 true; $E_{5'}K_3$ is low because flip-flop E5 enters PC#294 true. Thus, conditions do not exist to keep proposition $E_0$ high and it follows that, for the pulse position $P_0$, the E register content changes from 1 to 0.

For pulse position $P_1$, Fig. 24 shows that the content of the E register must also be changed from 1 to 0. Again the term $(E_5K_3'+E_5'K_3)$ is examined and again it is seen that neither subterm is high during pulse position $P_0$ because both flip-flops E5 and K3 were true. Thus, as before, for pulse position $P_1$, the E register content changes from 1 to 0.

Considering pulse position $P_2$, it is seen that the content of the E register must change from 0 to 1. Regarding term $(E_5K_3'+E_5'K_3)$, it is obvious that subterm $E_5'K_3$ cannot effectuate the change since flip-flop E5 was true during pulse position $P_1$. The change is therefore effectuated by subterm $E_5K'_3$, since during $P_1$ flip-flop E5 was true and flip-flop K3 was false (triggered false at the end of pulse position $P_0$: ${}_0k_3=P_{0-2}E_5'C$).

For pulse position $P_3$, the E register content is to remain 0. No change is effectuated since neither subterm $E_5K_3'$ nor subterm $E_5'K_3$ was high during pulse position $P_2$.

Figure 21:
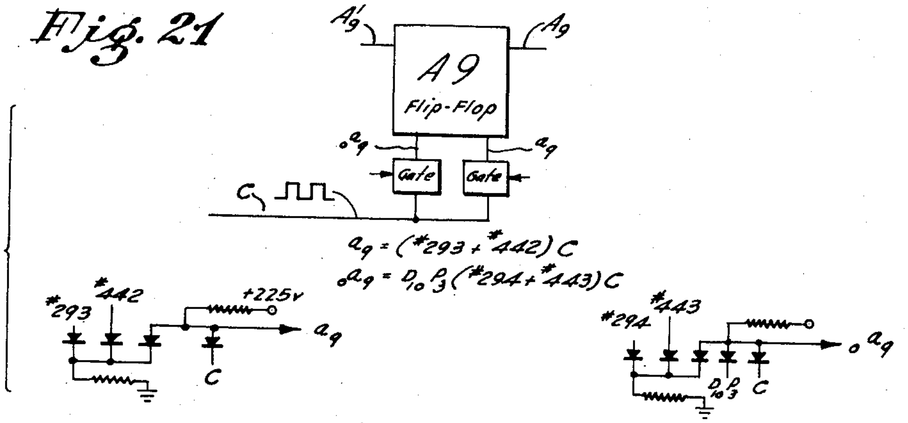
Figure 23:
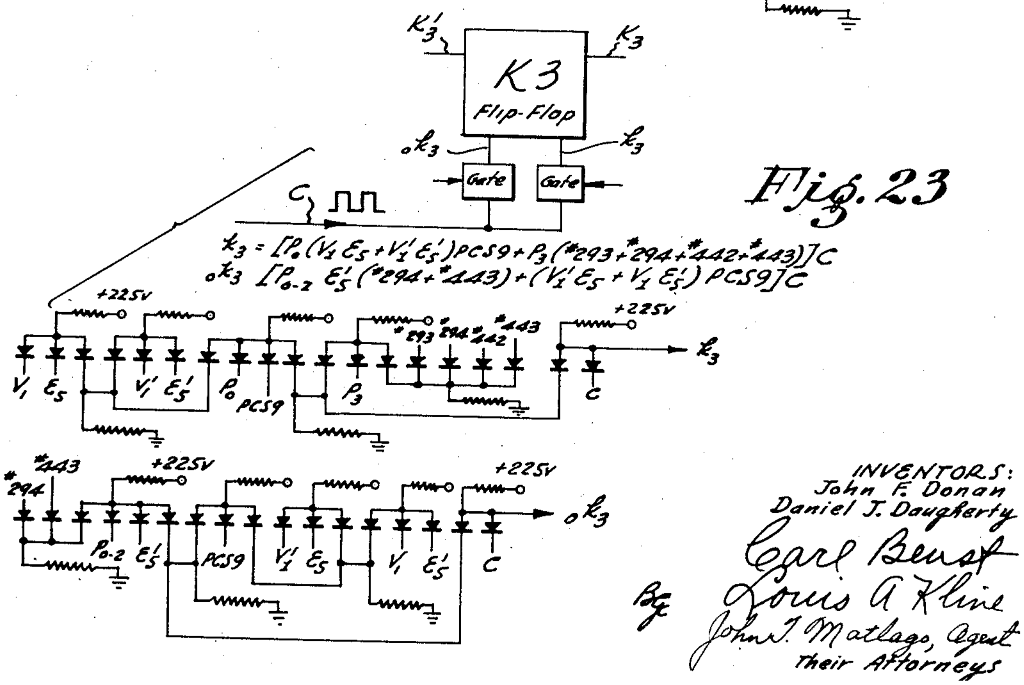

Subsequent unit additions to the E register content may be derived similarly. In brief, it is seen that, for any particular numeral recirculating in the E register, the above equation has the effect of adding one thereto by causing proposition $E_0$ to follow the complement of the state of flip-flop E5 until after the first binary "zero" occurs, and, subsequently, to follow the state of flip-flop E5 directly. Figs 21 and 23 show block diagrams of flip-flops A9 and K3 together with the logical equations defining their operation.

Finally, in PC#294, flip-flop K3 is triggered true as represented by $k_3=P_3C$ in order to enter in this state when the next unit addition to the E register content will be made, and flip-flop A9 is triggered false ${}_0a_9=D_{10}P_3C$ to inhibit any such unit addition for the next seven word period.

The activity of PC#295 is similar to that of PC#283 and will not be further described.

It is in PC#296 that rows 1 through 9 of the record card are read. Equations here are seen to be identical to those of PC#284 with the exception of the equation $V_0=\gamma$. It should be understood from the description of Figs. 18 and 19 that, at this time, periods $D_{0-9}$ of the V buffer register are filled with "zeros," since "zeros" had been filled in when row 0 of the card was read. The equation $V_0=\gamma$ symbolizes that, each time PC#296 is entered from PC#295, the card row at which brushes 216 are stationed is sensed for punches, and where a punch is detected, the E register content is transferred to the V buffer register. From Fig. 20 it is seen that the symbol $\gamma$ represents a summation of the symbols $\Delta$ of Fig. 16 for periods $D_{0-9}$ plus recirculation of the V buffer register for period $D_{10}$. Thus, when the computer leaves PC#296, all record card information appears in the V buffer register.

Fig. 15 tabulates the E register content as the sequence of PC#293 to PC#297 is repeated, and it is seen that the E register will be filled with "nines" (1100) when the entire record card has been read. The function of PC#297 is to test the E register content by means of the equations $n_d=D_1P_0E_2E_3C$ and ${}_0n_d=D_0C$. From prior discussion it should be understood that only if the E register content is "nine" (1100) in each D period, will both flip-flops E2 and E3 be true at $D_1P_0$. Thus, if the former equation holds, flip-flop N*d* causes counting into PC#298 as the first step in the well known routine ("look up") to insert V buffer register content into the computer main memory (not described here). If this equation does not hold, the computer is made to skip via line 228 of Fig. 10*d* back to PC#293 since there remains at least one more record card row to be read.

Next to be described is the record card punch routine presented in flow diagram form in Figs. 11*a* to 11*d*.

As with the record card read routine already described, it should be understood that the computer operator had programmed into the computer a command directing the computer to operate the card handling unit 205 so that record cards are sequentially positioned therein in order to be punched in accordance with the content of specified storage registers of the computer memory. The operator had placed into the G recirculating register, in periods $D_{7-9}$, the address of the first storage register whose contents are to be transferred to the first card as the first word. Upon pressing the start button (not shown), the computer will count out of the rest condition (PC#0) and sequence through a testing routine which will be successful for the code corresponding to the "card punch" command and results in the transfer of words from eight successive storage registers in the main memory commencing with that from the storage register whose address appears in the G register, to the computer V buffer register, and then enters PC#433, the first block in the flow diagram of Figs. 11*a* to 11*d* concerned with transferring computer information to the record card.

Referring to PC#433 of Fig. 11*a*, the statements and equations presented have been discussed with reference to Figs. 10*a* to 10*d*. Briefly, in PC#433, the V buffer register, the eight words of which are to be transferred to the record card, is recirculated so that arithmetic unit 103 may effectuate the transfer at any appropriate time. Here, also, the E register is filled with "ones" since row R of the card will be the first to receive information. As before, flip-flop N*d* enters PC#433 false, card handling unit 205 is started in response to this program counter output and, after an eight word period delay, the computer counts out.

The activity of PC#434 has also already been treated in connection with Figs. 10*a* to 10*d*. It is seen that the primary purpose here is to synchronize the V buffer register, employing the address in the G register and the arc addresses passing through flip-flop W*c* for the purpose.

It is in PC#435 that arrangement is made to fill columns 1 of each card word in correspondence with the content of periods $D_{10}$ of the V buffer register words. It is seen that counter A1–A8 and flip-flop N$d$ cause the sequence here to be conducted eight times. During each time, the E register content passing through flip-flop E5 and the V buffer register content passing through flip-flop V1 are compared and flip-flop K3 arranged to be triggered true if the comparison succeeds during pulse position $P_0$: $k_3=P_0(V_1E_5+V_1'E_5')C$; or false if the comparison fails: ${}_0k_3=(V_1'E_5+V_1E_5')C$. In other words, these equations state that, if, at $P_0$ of a D period the states of flip-fllops V1 and E5 are the same, the decimal digits of both registers in that D period are presumed identical and flip-flop K3 is triggered true. If, subsequently, during $P_{1-3}$ of the D period, this presumption fails, flip-flop K3 is triggered false. Thus, if at $P_0$ of a D period flip-flop K3 is true, it is an indication that, for the pervious D period, the decimal digits of the E and V buffer registers were identical. In accordance with the scheme of the invention as already outlined, it is desired that this identity cause a hole to be punched in the record card. The process by which this is accomplished will next be described.

It is noted that, for PC#435, flip-flop K2 is arranged to be triggered true if the above identity exists: $k_2=P_0K_3C$. As already mentioned, the invention provides means to energize the punching mechanisms of card handling unit 205, a common type of punching mechanism which, as shown in Fig. 29, consists of a group of punching relays, such as relay 231, one corresponding to each of the 80 card columns, and a group of punches, such as punch 232, arranged as armatures, one in each of the coils of said relays, to which is imparted abrupt motion when the relay coil is energized, and which motion causes a hole to be punched in record card 233. Means provided to energize relays 231 comprise, in the present embodiment of the invention, driver thyratron tubes, such as 229, one corresponding to each of relays 231 and grid networks, such as network 230, one for each of thyratrons 229. As Fig. 29 indicates, plate voltage for thyratrons 229 is supplied by line 220, which, as will be recalled from the discussion of Fig. 1, is energized with +125 v. only when a card row is in position to be sensed or punched. Thus, considering Fig. 29, when line 220 is energized, plate voltage is supplied to thyratron 229 and a positive pulse applied to grid network 230 will cause thyratron 229 to conduct, thereby energizing relay 231 and causing punch 232 to perforate card 233. Further, when line 220 is not energized (i.e., a card row is not in position to be perforated), plate voltage of thyratron 229 is removed and conduction ceases. The energizing pulses required take the form of firing propostion $T_{1-1}$, $T_{1-2}$, . . . $T_{8-10}$, one corresponding to each thyratron and to each of the ten card columns devoted to each of the eight card words.

Figure 22:
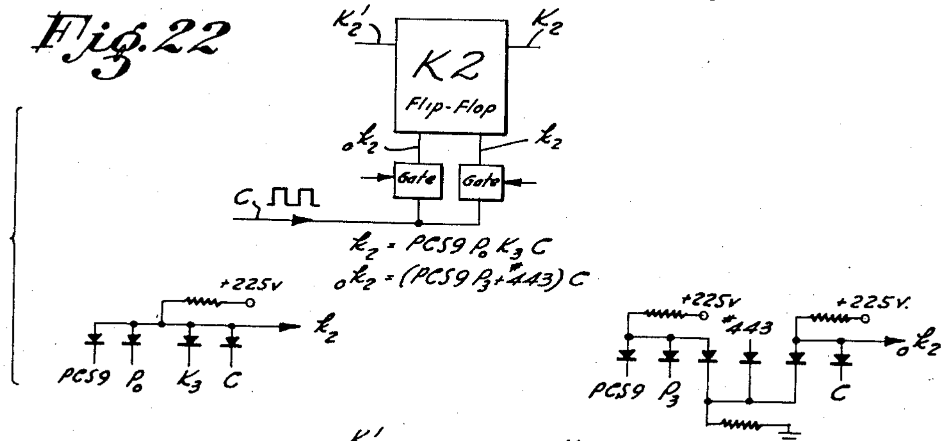

Referring next to Fig. 28, here are shown the diode networks for energizing the thyratron grid propositions, together with the equations representing their operation. It is seen that output $K_2$ enters as a logical multiplier in all equations and thus flip-flop K2 must be true in order that a thyratron be fired. Fig. 22 shows the block diagram, logical equations and composite diode networks for triggering flip-flop K2.

Returning again to PC#435 of Fig. 11$a$, it is thus seen that the thyratron firing equations shown in Fig. 29, through the intervention of flip-flop K2, are effective in PC#435 although not shown. Finally, at $P_3$ of each D period, flip-flop K2 is triggered false in order that it may enter the next D period in this state.

PC#'s 436 to 438 of Fig. 11$b$ operate in a fashion similar to PC#'s 433 to 435 of Fig. 11$a$ except that the E register content is changed to "threes" (PC#436) and row X of the card is handled, a "three" replacing the prior "one" in the event a V buffer register word is a negative number of an instruction of the group J–R.

The sequence PC#439 to PC#441 of Fig. 11$c$ provides for punching row 0 of the card, where required.

Finally, the sequence from PC#442 to PC#445 of Fig. 11$d$, providing for punching rows 1 through 9 of the record card, is followed nine times. It is noted that each of said times, the E register content is increased by one unit as described for the card read routine, and that prior to punching any row, synchronization is performed. It is also noted that, during PC#443, flip-flop K2 is triggered false: ${}_0k_2=C$. This is done to avoid setting up a thyratron for firing prior to the time called for by the firing equations effective during PC#444.

Upon completion of the card punch routine, Fig. 11$d$ indicates the return of the computer to the rest condition, PC#0. It is noted that computer design may include other routines, such as a routine to provide for reading or punching a succession of record cards sufficient in number to fill the memory.

Reference may be made to Figs. 25, 26 and 27 for the composite diode networks and logical equations for propositions $G_0$, $E_0$ and $V_0$, respectively.

While the form of the invention shown and described herein is admirably adapted to fulfill the objects primarily stated, it is to be understood that it is not intended to confine the invention to the one form or embodiment disclosed herein, for it is susceptible of embodiment of various other forms.

What is claimed is:

1. A system for reading information from a record card into a digital computer comprising a multi-word period recirculating register; a one-word period recirculating register synchronized to operate in accordance with the advance of said multi-word period register; a plurality of sensing elements responsive to holes on one of the digit rows of the record card being read, each said sensing element corresponding to a digit position in said multi-word period register; means for inserting, in all the digit positions of said one-word period register, coded signals corresponding to the digit row of the record card; and means for successively transferring coded signals from the digit positions of said one-word period register to the corresponding digit positions of the words in said multi-word period register in accordance with whether or not a hole is sensed on said record card by each said sensing element.

2. A system for reading information from a record card into a digital computer comprising a rotating magnetic drum memory; a one-word period recirculating register cooperating with said memory; a multi-word period recirculating register cooperating with said memory; a plurality of sensing elements responsive to holes on one of the digit rows of said record card, each said sensing element corresponding to a digit position in said multi-word period register; means for setting up coded signals equal in value to the digit row of the record card in all the digit positions of said one-word period register; and means for transferring coded signals from the digit positions of said one-word period register to the corresponding digit positions of the words in said multi-word period register in accordance with whether or not a hole is sensed on said record card by each said sensing element.

3. A system for reading a number into a digital computer comprising a rotating magnetic drum memory; a first recirculating register synchronized to advance with said memory; a plurality of sensing elements, each corresponding to a digit position of the first register, and each capable of being energized with a signal having the same digit value assigned thereto at a given time; a second recirculating register synchronized to advance with said memory; means for changing the coded signals in all of the digit positions of said second register to correspond to the digit value assigned to the signals on said sensing elements at a given time; and means successively responsive to the presence of signals on each said sensing element for directing coded signals from said second register into the digit positions of said first register.

4. A system for reading a number into a digital computer comprising a rotating magnetic drum memory; a first recirculating register synchronized to advance with said memory; a plurality of sensing elements, each corresponding to a digit position of the first register, and each capable of being energized with a signal having the same digit value assigned thereto at a given time; a second recirculating register synchronized to advance with said memory; means for changing the coded signals in all of the digit positions of said second register to correspond to the digit value assigned to the signals on said sensing elements at a given time; means successively responsive to said sensing elements for directing coded signals from said second register into the digit positions of said first register in accordance with the presence of signals on each said sensing element; and means for synchronizing the operation of said transfer means with the advance of said recirculating register.

5. A system for reading a number into a digital computer comprising a rotating magnetic drum memory provided with a reference channel; a first recirculating register synchronized to advance with said memory; a plurality of sensing elements, each corresponding to a digit position of the first register, and each capable of being energized with a signal having the same digit value assigned thereto at a given time; a second recirculating register synchronized to advance with said memory; means for changing the coded signals in all of the digit positions of said second register to correspond to the digit value assigned to the signals on said sensing elements at a given time; means successively responsive to said sensing elements, for directing coded signals from said second register into the digit positions of said first register in accordance with the presence of signals on each said sensing element; and means responsive to the signals on the reference channel of said drum memory for synchronizing the operation of said transfer means with the advance of said recirculating register.

6. A system for reading a number into a digital computer comprising a first recirculating register having an input; a plurality of sensing elements, each corresponding to a digit position of the first register, and each capable of being energized with a signal having the same digit value assigned thereto at a given time; a second recirculating register having an input and an output; means capable of being connected to the input of said second register for changing the code signals in all of the digit positions of said second register to correspond to the digit value assigned to the signals on said sensing elements at a given time; and means successively responsive to said sensing elements for connecting the output of said second register to the input of said first register during each coded digit period that the sensing element being responded to has a signal thereon.

7. A system for reading information from a record card into a digital computer comprising a rotating magnetic drum memory; a one-word period recirculating register cooperating with said memory; a multi-word period recirculating register cooperating with said memory; a plurality of sensing elements responsive to holes on one of the digit rows of said record card, each said sensing element corresponding to a digit position in said multi-word period register; means for setting up coded signals equal in value to the digit row of the record card in all the digit positions of said one-word period register; counting means for generating signals corresponding to the word and digit positions of said multi-word register; and means controlled by the signals generated by said counting means for successively transferring coded signals from the digit positions of said one-word period register to the corresponding digit positions of the words in said multi-word period register in accordance with whether or not a hole is sensed on said record card by each said sensing element.

8. A system for reading information from a record card into a digital computer comprising a rotating magnetic drum memory; a multi-word period recirculating register cooperating with said memory; a plurality of sensing elements responsive to holes on a digit row of said record card, each said sensing element corresponding to a digit position in said multi-word period register; a one-word period recirculating register cooperating with said memory, said one-word register being provided in all the digit positions thereof with coded digit signals equal in value to the digit row of the record card; counting means for generating signals corresponding to the word and digit positions of said multi-word register; means controlled by the signals generated by said counting means for successively transferring coded signals from the digit positions of said one-word period register to the corresponding digit positions of the words in said multi-word period register in accordance with whether or not a hole is sensed on said record card by each said sensing element; and means for adding a unit to the coded digit signals in all the digit positions of said one-word period register each time said plurality of sensing elements are positioned to the next higher order digit row of the record card.

9. A system for reading information from a record card into a digital computer comprising a rotating magnetic drum memory; a reference channel on said drum memory having word-period-identifying signals repeating in periods equal to a sub-multiple of the cycle periods of said memory; a first and second recirculating register operating over the surface of said drum memory so as to have a one-word delay period, said second recirculating register being provided with a word-period-identifying signal corresponding to a signal on said reference channel; comparing means for generating a signal when the word-period-identifying signal in said second recirculating register compares with signals sensed on successive word periods of said reference channel; a third recirculating register operating over the surface of said drum memory so as to have a delay period equal to said sub-multiple of the cycle period of said memory; a plurality of sensing elements responsive to holes on one of the digit rows of the record card being read to generate transfer signals, each said sensing element corresponding to a digit position in said third recirculating register; means for inserting in all the digit positions of said first recirculating register coded signals corresponding to the digit row of the record card being read; means for successively transferring coded digit signals from the digit positions of said first recirculating register to the corresponding digit positions of the word periods in said third recirculating register in accordance with whether or not a transfer signal is generated on each sensing element; and means for initiating the operating of said transfer means in response to a signal generated by said comparing means.

10. A system for communicating between a digital computer and media of the record card type comprising a multi-word period recirculating register for storing digital information; a one-word period recirculating register synchronized to operate in accordance with the advance of said multi-word period register; a plurality of connecting lines, each said line for communicating between a digit position in said multi-word period register and one of the columns of the rows of the record card being communicated with; means for inserting in all the digit positions of said one-word period register coded signals corresponding to the digit value of the record card row being communicated with; and circuit means operable to transpose information by way of said connecting lines between the digit positions of said multi-word register and the columns of the rows of the record card as determined by the coded signals stored in said one-word period recirculating register.

11. A read-out circuit for a digital computer comprising a first recirculating device storing binary information representing numerals; a second recirculating device simultaneously operating with said first recirculating device and storing binary information representing a particular numeral; means to serially compare the binary information in said first and second devices whereby signals are generated when the comparison succeeds; an output circuit; means to gate the signals from said comparing means to said output circuit; and means to change the binary information in said second recirculating device to represent other particular numerals.

12. A system for reading out information from a digital computer to a record card comprising a multi-word period recirculating register for storing digital information to be read out; a one-word period recirculating register synchronized to operate in accordance with the advance of said multi-word period register; a plurality of output lines connected to actuate punches positioned along a row of the record card, each said output line corresponding to a digit position in said multi-word period register; means for inserting in all the digit positions of said one-word period register coded signals corresponding to the digit value of the row on the record card at which the punches are positioned; and means successively comparing the coded signals in said one-word period register with coded signals in corresponding digit positions of the words in said multi-word period register for generating a signal on the corresponding output line each digit period that the comparison is successful.

13. In a system for reading out information from a digital computer to media of the record card type, a rotating magnetic drum memory; a first recirculating register synchronized to advance with said memory; a second recirculating register synchronized to advance with said memory for storing information in the form of coded decimal signals; a plurality of output lines connected to actuate punches positioned along a row of the record card, each said output line corresponding to a coded decimal digit position in said second recirculating register; means for changing the coded signals in all of the coded decimal digit positions of said first recirculating register to correspond to the digit value assigned to the row of the record card on which said punches are positioned; and means successively comparing the coded decimal signals in said first recirculating register with the coded decimal signals in corresponding digit positions of said second recirculating register for generating a signal on the corresponding output line each coded decimal digit period that the comparison is successful.

14. In a system for reading out information from a digital computer to media of the record card type, a cyclical memory; a first recirculating register synchronized to advance with said memory; a second recirculating register synchronized to advance with said memory for storing the digital information to be read out in the form of coded decimal signals; a plurality of output lines connected to actuate punches positioned along a row of the record card, each said output line corresponding to a coded decimal digit position in said second recirculating register; means for inserting coded signals in all of the coded decimal digit positions of said first recirculating register corresponding to the digit value assigned to the row of the record card on which the punches are positioned; means successively comparing coded decimal signals in said second recirculating register with coded decimal signals in corresponding digit positions of the words in said first recirculating register for generating a signal on the corresponding output line when the comparison is successful; and means for synchronizing the operation of said comparing means with the advance of said recirculating registers.

15. In a system for reading out information from a digital computer to media of the record card type, a rotating magnetic drum memory provided with a reference signal channel; a first recirculating register synchronized to advance with said memory; a second recirculating register synchronized to advance with said memory; a plurality of output lines, each connected to actuate a punch positioned along a row of the medium on which information is to be read out, each said output line corresponding to a coded decimal digit position in said second recirculating register; means for changing the coded signals in all of the coded decimal digit positions of said first recirculating register to correspond to the digit value assigned to the row of the medium; means successively comparing the coded decimal signals in said second recirculating register with coded decimal signals in corresponding digit positions of said first recirculating register for generating a signal on the corresponding output line each coded decimal digit period that the comparison is successful; and means responsive to the signals sensed from the reference channel of said drum memory for synchronizing the operation of said comparing means with the advance of said recirculating register.

16. In a system for reading out information from a digital computer to media of the record card type, a rotating magnetic drum memory having a synchronizing signal channel about the periphery thereof; a one-word recirculating register synchronized to advance with said memory; a multi-word recirculating register synchronized to advance with said memory; a plurality of output lines, each connected to actuate a punch positioned along a row of the record card on which information is to be read out, each said output line corresponding to a coded decimal digit position in said multi-word recirculating register; means for changing the coded signals in all of the coded decimal digit positions of said one-word recirculating register to correspond to the digit value assigned to the row of the record card; counting means responsive to the signals sensed on the synchronizing channel of said memory for generating signals corresponding to the word and digit positions of said multi-word register; and means controlled by the signals generated by said counting means for successively comparing the coded decimal signals in the words of said multi-word recirculating register with coded signals in corresponding digit positions of said one-word recirculating register for generating a signal on the corresponding output line each coded decimal digit period that the comparison is successful.

17. A system for reading information from a digital computer to a record card comprising a rotating magnetic drum memory; a reference channel on said drum memory having word-period-identifying signals repeated in periods equal to a sub-multiple of the cycle period of said memory; a first and second recirculating register operating over the surface of said drum memory each having a one-word period delay, said second recirculating register being provided with a word-period-identifying signal corresponding to a signal on said reference channel; a first comparing means for generating a signal when the word-period-identifying signals in said second recirculating register compare with signals sensed from said reference channel; a third recirculating register operating over the surface of said drum memory so as to have a delay period equal to said sub-multiple of the cycle period of said memory; a plurality of output lines, each connected to actuate a punch positioned along a row of the record card, each of said output lines corresponding to a digit position in said third recirculating register; means for inserting in all the digit positions of said first recirculating register coded signals corresponding to the digit value of the row of said record card at which the punches are positioned; and a second comparing means operable upon receipt of a signal from said first comparing means for successively generating signals to be applied on said output lines when the coded signals in digit positions of said third recirculating register compare with the coded signals in corresponding digit positions in said first recirculating register.

18. Electrical data processing apparatus for effecting the transfer of digital data between a multi-word-field record card and a dynamic data storage device, transfer being effected as a series of operations during a sequence of word periods, each defined by a recurring timing signal cycle derived from a timing signal source, characterized in that the storage device comprises a multi-word-period recirculating register having a word period corresponding to each word field of the card and further characterized by a one-word-period recirculating register synchronized with each successive word period of the multi-word-period register, a network for generating logical propositions including first logical circuitry for controlling trigger means associated with the one-word-period register to insert, in all digit positions thereof, signals corresponding to data to be transferred between the card and the storage device, and further logical circuitry including means for inhibiting said transfer until the one-word-period register is synchronized with a predesignated first-word-period of the multi-word-period register, said further logical circuitry being responsive to control signals including timing signals from the timing signal source, and signals derived from sensing means associated with the one-word-period register, in conjunction with signals derived from sensing means associated with the card or with signals derived from sensing means associated with the multi-word-period register, said control signals acting either to effect a transfer from the one-word period register to locations in the currently synchronized word period of the multi-word-period register determined by data signals sensed from the card or to effect a transfer from the one-word-period register to locations on the card determined by data stored in the currently synchronized word period of the multi-word-period register.

References Cited in the file of this patent

UNITED STATES PATENTS 2,749,037 Stibitz ---------------- June 5, 1956

UNITED STATES PATENT OFFICE
CERTIFICATE OF CORRECTION

Patent No. 2,902,214

September 1, 195

John F. Donan et al.

It is hereby certified that error appears in the printed specificatio of the above numbered patent requiring correction and that the said Letter Patent should read as corrected below.

Column 3, line 71, strike out "the", first occurrence; column 5, line 57, for "parallel on" read -- parallel one --; column 6, line 30, for "arc' read -- arcs"; line 53, before "successively" strike out "the"; line 71, strike out "the", first occurrence; column 9, line 23, before "diode" insert -- to --.

Signed and sealed this 1st day of March 1960.

(SEAL)
Attest:

KARL H. AXLINE
Attesting Officer

ROBERT C. WATSON
Commissioner of Patents